United States Patent
Wong

(10) Patent No.: US 9,559,995 B1
(45) Date of Patent: Jan. 31, 2017

(54) SYSTEM AND METHOD FOR BROADCASTING CONTENTS FROM WEB-BASED BROWSER TO A RECIPIENT DEVICE USING EXTENSIBLE MESSAGING AND PRESENCE PROTOCOL (XMPP)

(71) Applicant: Meteors Information Systems Limited, Hong Kong (HK)

(72) Inventor: Yiu Fai William Wong, Hong Kong (HK)

(73) Assignee: METEORS INFORMATION SYSTEMS LIMITED, Hong Kong (HK)

( * ) Notice: Subject to any disclaimer, the term of this patent is extended or adjusted under 35 U.S.C. 154(b) by 0 days.

(21) Appl. No.: 15/221,594

(22) Filed: Jul. 28, 2016

Related U.S. Application Data

(60) Provisional application No. 62/243,151, filed on Oct. 19, 2015.

(51) Int. Cl.
| | | |
|---|---|---|
| *G06F 15/16* | (2006.01) | |
| *H04L 12/58* | (2006.01) | |
| *H04L 29/08* | (2006.01) | |
| *H04L 29/06* | (2006.01) | |

(52) U.S. Cl.
CPC ........... *H04L 51/046* (2013.01); *H04L 51/38* (2013.01); *H04L 63/083* (2013.01); *H04L 65/1069* (2013.01); *H04L 67/02* (2013.01); *H04L 67/104* (2013.01); *H04L 67/42* (2013.01)

(58) Field of Classification Search
CPC ........ H04L 51/046; H04L 51/38; H04L 67/02; H04L 67/104; H04L 67/42; H04L 63/083; H04L 65/1069

USPC .......................................................... 709/206
See application file for complete search history.

(56) References Cited

U.S. PATENT DOCUMENTS

| 8,923,812 | B1 * | 12/2014 | Koum | H04W 4/14 455/410 |
|---|---|---|---|---|
| 9,258,261 | B1 * | 2/2016 | O'Connor | H04L 67/02 |
| 9,338,287 | B1 * | 5/2016 | Russo | H04W 12/06 |
| 9,473,428 | B1 * | 10/2016 | Koum | H04L 51/04 |
| 2013/0308628 | A1 * | 11/2013 | Marueli | H04L 65/1076 370/352 |
| 2014/0307543 | A1 * | 10/2014 | Marueli | H04L 47/12 370/229 |

(Continued)

FOREIGN PATENT DOCUMENTS

CN    103001860 A    3/2013

*Primary Examiner* — Tauqir Hussain

(57) ABSTRACT

Disclosed is a system and method for broadcasting one or more contents to a recipient device. The system comprises a web server accessed by a sender device via a web browser, a content repository, an OJC server and an XMPP server accessed by a recipient device, an XMPP client. The web server receives, via the web browser, a broadcasting request from the sender device, wherein the broadcasting request comprises contents to be broadcasted to the XMPP client. The web server stores the contents in the content repository. The OJC server detects a connection request received from the XMPP client via the XMPP server. The connection request is received to initiate broadcasting of the contents to the XMPP client. The OJC server retrieves the contents from the content repository based upon the receipt of the connection request and thereafter transmits the contents to the XMPP client via the XMPP server.

16 Claims, 15 Drawing Sheets

(56) References Cited

U.S. PATENT DOCUMENTS

| | | | |
|---|---|---|---|
| 2015/0038121 A1* | 2/2015 | Koum | H04L 51/10 |
| | | | 455/412.2 |
| 2015/0040029 A1* | 2/2015 | Koum | H04L 51/10 |
| | | | 715/748 |
| 2015/0245187 A1 | 8/2015 | Vishwanathan et al. | |
| 2016/0165446 A1* | 6/2016 | Russo | H04W 12/06 |
| | | | 455/411 |
| 2016/0205169 A1* | 7/2016 | Koum | H04L 67/025 |
| | | | 709/206 |

\* cited by examiner

SYSTEM AND METHOD FOR BROADCASTING CONTENTS FROM WEB-BASED BROWSER TO A RECIPIENT DEVICE USING EXTENSIBLE MESSAGING AND PRESENCE PROTOCOL (XMPP)

CROSS-REFERENCE TO RELATED APPLICATIONS AND PRIORITY

The present application claims priority from US Provisional Patent Application No. 62/243,151 dated Oct. 19, 2015, incorporated herein as a reference.

TECHNICAL FIELD

The present subject matter described herein, in general, relates to a system and method for broadcasting contents from a web-based browser to a recipient device using extensible messaging and presence protocol (XMPP), and more particularly to a system and method for broadcasting real time instant messages from the web-based browser to the recipient device using the extensible messaging and presence protocol (XMPP).

BACKGROUND

With the advent of cellular technologies, there has been tremendous increase in the number of cellular subscribers worldwide. One of the many ways of communications supported through the cellular technologies is a messaging functionality wherein the cellular subscribers may share one or more messages to the recipients via cellular phones operated in cellular communication networks. Though there have been advancements made in the messaging techniques, the most preferred messaging technique utilized today is still a short messaging service (SMS) technique. In the recent times, the use of SMS technique has changed from person-to-person (P2P) messaging to application-to-person (A2P) messaging. As against to the P2P messaging where the messages are exchanged between two mobile subscribers, the A2P messaging allows sending messages via an application (e.g. a web application) to one or more mobile subscribers. Alternatively, the A2P messaging also enables sending messages from a mobile subscriber to the web application.

Typically, the A2P messaging are used to send alerts, notifications and marketing or promotional messages such as banking alerts and/or flight alerts. In one example, the A2P messaging may be used by an airline company to notify passengers about the department time and departure gate. Similarly, in another example, an insurance company may notify its colleagues to attend a financial seminar. In the existing art, a communication protocol called an Extensible Messaging and Presence Protocol (XMPP) is available for message-oriented middleware based on XML (Extensible Markup Language). The XMPP enables near-real-time exchange of structured yet extensible data between any two or more network entities. However, the exchange of data using the existing conventional XMPP based techniques is only based on peer-to-peer data exchange environment.

SUMMARY

This summary is provided to introduce concepts related to systems and methods for broadcasting one or more contents to a recipient device and the concepts are further described below in the detailed description. This summary is not intended to identify essential features of the claimed subject matter nor it is intended for use in determining or limiting the scope of the claimed subject matter.

In an implementation, a method for broadcasting one or more contents to a recipient device is disclosed. The method may comprise receiving, by a first processing unit, a broadcasting request from a sender device. In an embodiment, the first processing unit is a web server, and wherein the web server receives the broadcasting request from the sender device via a web browser associated to the sender device. The broadcasting request comprises one or more contents along with metadata associated to the one or more contents, wherein the one or more contents are to be broadcasted to a recipient device. Further, the method may comprise storing, by the first processing unit, the one or more contents along with the metadata in a content repository coupled to the first processing unit. The method may further comprise detecting, by a second processing unit coupled to the content repository, a connection request received from the recipient device, wherein the connection request is received by the second processing unit via a third processing unit communicatively coupled with the recipient device. In an embodiment, the second processing unit, the third processing unit and the recipient device is an OJC (Openfire JAVA Component) server, an XMPP server and an XMPP client device (hereinafter referred to as an XMPP client) respectively. The OJC server may further comprise a cluster of computing nodes. In one aspect, the connection request is received from the recipient device to initiate broadcasting of the one or more contents to the recipient device. Further, the method may comprise retrieving, by the second processing unit, the one or more contents from the content repository based upon the receipt of the connection request. Furthermore, the method may comprise transmitting, by the second processing unit, the one or more contents to the recipient device via the third first processing unit.

In another implementation, a system for broadcasting one or more contents to a recipient device is disclosed. The system may comprise a first processing unit communicatively coupled to a sender device. The first processing unit may be configured to receive a broadcasting request from the sender device. In an embodiment, the first processing unit is a web server, and wherein the web server receives the broadcasting request from the sender device via a web browser associated to the sender device. The broadcasting request comprises one or more contents along with metadata associated to the one or more contents, wherein the one or more broadcasting contents are to be broadcasted to a recipient device. The first processing unit may be further configured to store the one or more contents along with the metadata in a content repository coupled to the first processing unit. The system may further comprise a second processing unit communicatively coupled with the recipient device via a third processing unit. The second processing unit may be configured to detect a connection request received from the recipient device, wherein the connection request is received via the third processing unit. In an embodiment, the second processing unit, the third processing unit and the recipient device is an OJC server, an XMPP server and an XMPP client device respectively. The OJC server may further comprise a cluster of computing nodes. In one aspect, the connection request is received from the recipient device to initiate broadcasting of the one or more contents to the recipient device. The second processing unit may further be configured to retrieve the one or more contents from the content repository based upon the receipt of the connection request. Furthermore, the second processing unit may be configured to transmit the one or more contents to the recipient device via the third first processing unit.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
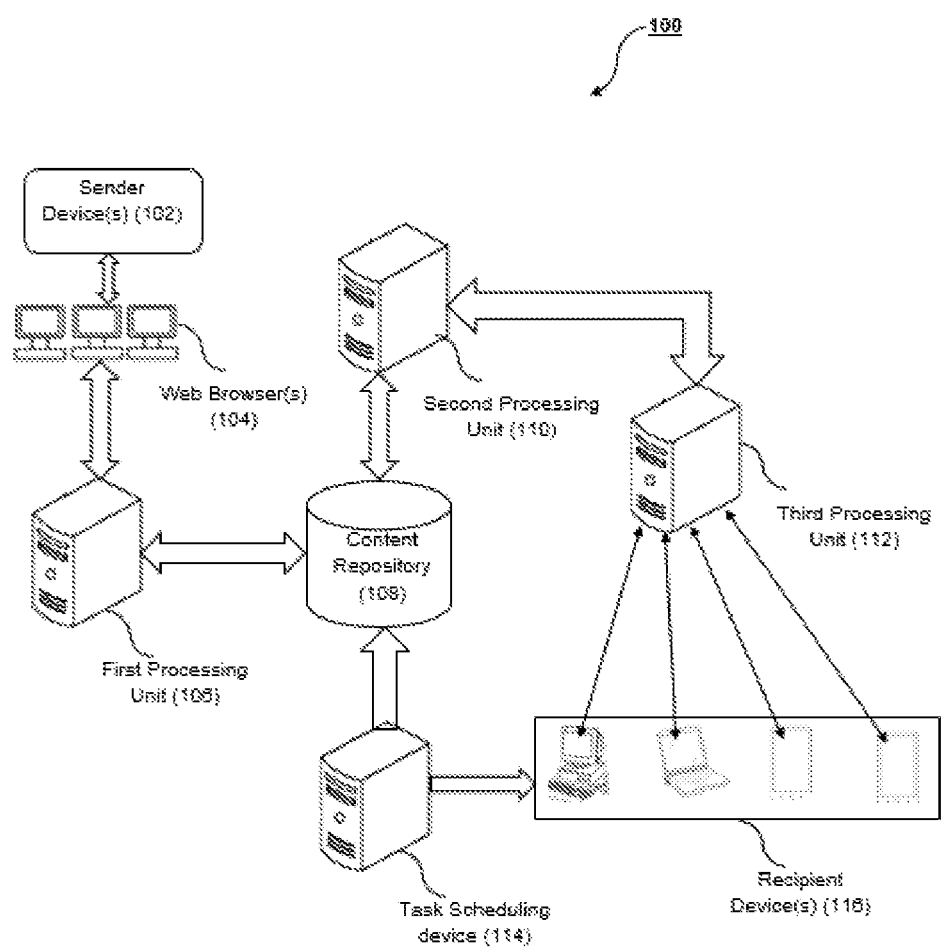
FIG. 1 illustrates a network implementation of a system 100 enabling broadcasting of one or more contents to a recipient device, in accordance with an embodiment of the present subject matter.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System(s) and method(s) for broadcasting of one or more contents to a recipient device are described. More particularly, the present disclosure describes system(s) and method(s) to broadcast nearly instant messages from a web-based browser to a smartphone-based application or an App using XMPP. In accordance with aspects of the present disclosure, the system may include a sender device (belonging to a web user intending to send a message), the web-based browser, a web server, a content repository, a task scheduling device (middleware application/device), an XMPP server, an OJC (Openfire JAVA component) server and a recipient device (belonging to an App user intending to receive the message). It must be understood that the OJC server is an Openfire JAVA component which is written by JAVA (programming language) used for Openfire. The OJC server comprises a cluster of external components (hereinafter referred as computing nodes interchangeably) configured to communicate with the XMPP server. The XMPP server further communicates with the recipient devices which are XMPP client devices or applications (Apps) residing on the XMPP client devices.

In one aspect, a user of the sender device (also referred hereinafter as a web user) may transmit, via the web-based browser, a broadcasting request to the web server. The web-based browser may provide an interface for the web user to store the broadcasting request from the web user. The broadcasting request may include a messaging content, the recipient device (also referred hereinafter as an App) and a scheduled time for the delivery of the message. The broadcasting request may be stored in the content repository and further processed by the task scheduling device. In one embodiment, the task scheduling device may notify the App via a notification message to access the XMPP server and thereby retrieve the intended messages sent by the web user. In another embodiment, irrespective of the notification from the task scheduling device, the App may trigger an event to automatically login with the XMPP server and thereby retrieve the messages. In this embodiment, as-soon-as the App user unlocks the screen or a WI-FI is connected or the App is started, the App may login to the XMPP server in order to fetch the messages from the XMPP server as a background service. In an embodiment, the XMPP client may login with the XMPP server using an authentication password dynamically generated based on partial string of a username, last messaging ID and a last current login timestamp.

In one aspect, the messages are retrieved and transferred via the OJC server. The OJC server may detect any new connection request from an XMPP client, wherein the connection request indicates the XMPP client's intention to retrieve the messages stored in the content repository corresponding to the said XMPP client initiating the connection request with the OJC server. The OJC server may be configured to retrieve the corresponding messages from the content repository and thereafter transfer the corresponding messages to the respective XMPP client. The OJC is formed by a cluster of external components (computing nodes or computing machines) collectively performing the distributed tasks of retrieval and transfer of messages corresponding to multiple XMPP clients coupled to the XMPP server using a OJC load balancing technique. In an embodiment, a message reaching time to the App may be recorded with the content repository.

After the completion of the retrieval of the messages, the XMPP clients may be kicked off after a period of idle time monitored and controlled by the XMPP server. The kick-off the XMPP clients ensure that the XMPP clients do not connect persistently due to the business working environment of the users of the XMPP clients. Further, as-soon-as the user of the App reads and/or replies the message, the App may login to the XMPP server and facilitate updating of the content repository a timestamp pertaining to the reading and/or replying of the message through the OJC server. Finally, the web user may refresh a web page in the web-based browser in order to retrieve the latest delivery results from the content repository.

While aspects of described system and method for broadcasting of one or more contents to a recipient device may be implemented in any number of different computing systems, environments, and/or configurations, the embodiments are described in the context of the following exemplary system.

Referring now to FIG. 1, a network implementation of a system 100 for broadcasting of one or more contents to a recipient device is illustrated, in accordance with an embodiment of the present subject matter. As shown in FIG. 1, the system 100 may comprise a sender device(s) 102 communicatively coupled to a first processing unit 106 via web browser(s) 104. Examples of the sender device(s) 102 may include, but are not limited to, a mobile device, a personal digital assistant (PDA), a mobile computing device, a communication device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance and the like. In one embodiment, the first processing unit 106, coupled to the sender device 102, is a web server. Hereinafter, the first processing unit 106 will be referred as a web server 106. The web server 106 may be further coupled to a content repository 108 configured to store a plurality of contents. The content repository 108 may be further accessed by a second processing unit 110 and a task scheduling device 114 as shown in FIG. 1. In one embodiment, the second processing unit 110 is an OJC (Openfire JAVA component) server. Hereinafter, the second processing unit 110 will be referred as an OJC (Openfire JAVA component) server 110. The OJC server 110 is further coupled to a third processing unit 112 as shown.

In one embodiment, the third processing unit 112 is an Extensible Messaging and Presence Protocol (XMPP) server. Hereinafter, the third processing unit 112 will be referred as an XMPP server 112. The XMPP server 112 may further be accessible by recipient device(s) 116 or application(s) residing on the recipient devices(s) 116. In one embodiment, each of the recipient device(s) 116 may be an XMPP client device. Hereinafter, each of the recipient device(s) 116 will be referred as an XMPP client device 116. Examples of the XMPP client device 116 may include, but are not limited to, a mobile device, a personal digital assistant (PDA), a mobile computing device, a communication device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance and the like.

The aforementioned computing devices including the sender device(s) 102, the web server 106, the OJC server 110, the XMPP server 112, the task scheduling device 114 and the XMPP client device(s) 116 may include at least one processor, an input/output (I/O) interface and a memory (not shown in FIG. 1). The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow to interact with other computing devices and end users. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and data. The modules include routines, programs, objects, components, data structures, etc., which perform particular tasks or implement particular abstract data types. The data, amongst other things, serves as a repository for storing data processed, received, and generated by one or more of the modules.

The aforementioned computing devices may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1×RTT, GSM/GPRS, EDGE, HSDPA, HSUPA, and others.

The aforementioned computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electromagnetic induction (EMI) communication, passive or active RFID communication, micro-impulse radar (MIR), ultra-wide band (UWB) communication, automatic identification and data capture (AIDC) communication, and others.

Figure 2:
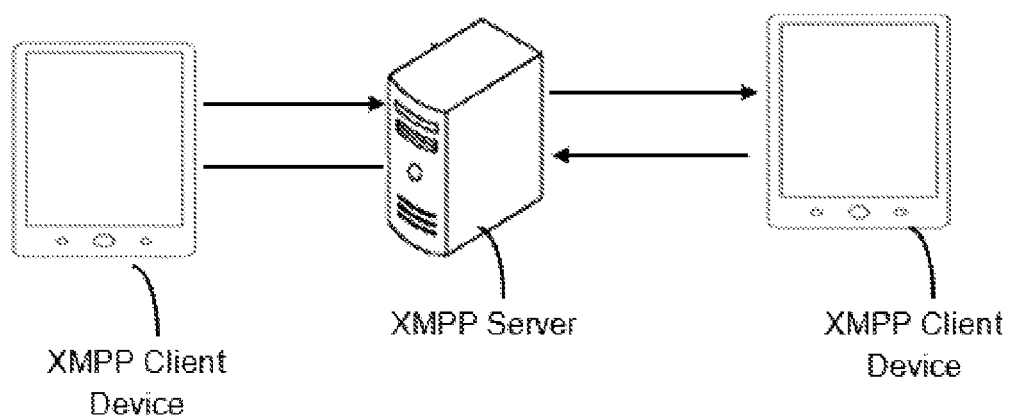
FIG. 2 illustrates a conventional technique of an XMPP-based peer-to-peer messaging environment.

The aforementioned computing devices collectively enable the broadcasting of the one or more contents from the sender device(s) 102 (hereinafter referred as a sender device 102 or a web user 102 interchangeably) to the XMPP client device(s) 116 (hereinafter referred as XMPP client device 116 or XMPP client App116 or an App user 116 interchangeably). The one or more contents may belong to the web user 102, wherein the one or more contents are to be broadcasted to the App user 116. In some embodiments, the one or more contents may comprise at least one of a text message, an audio message, a video message, a multimedia message, an image and a combination thereof. In one example, the one or more contents herein may include bulk messages to be broadcasted by the web user 102 to the App user 116 using an Extensible Messaging and Presence Protocol (XMPP). In general, the XMPP enables near-real-time exchange of structured yet extensible data between two or more network entities, namely XMPP clients. FIG. 2 illustrates a conventional/traditional technique enabling peer-to-peer exchange of contents using the XMPP. As shown, the XMPP server enables transfer of data amongst the XMPP devices. Therefore, in the existing scenario, both the sender device and the recipient device has to be XMPP client devices in order to enable transfer of data between the two devices via the XMPP server as shown in FIG. 2.

Figure 3:
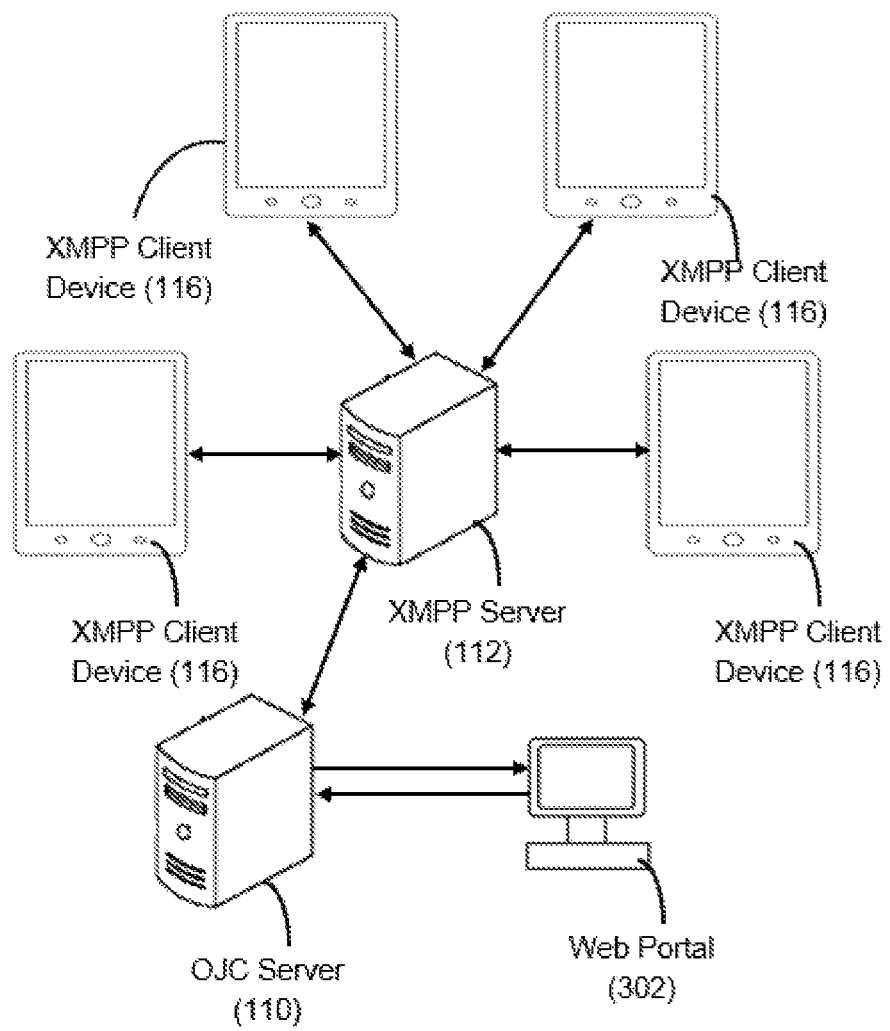
FIG. 3 illustrates a centralized XMPP-based broadcasting technique for broadcasting messages to a plurality of XMPP clients via a centralized XMPP server, in accordance with an embodiment of the present subject matter.

As against to the aforementioned conventional/traditional technique, the present system 100 enables the transfer of data to XMPP client device via a non-XMPP component, namely OJC component (i.e. OJC server 110 shown in FIG. 1). FIG. 3 illustrates the centralized XMPP-based broadcasting technique of broadcasting messages to a plurality of XMPP client devices 116 via a centralized XMPP server 112, in accordance with an embodiment of the present subject matter. As shown in FIG. 3, the messages to be broadcasted originates from a web portal 302 which receives the messages from the sender device 102 via the web browser 104. The messages are then transferred via a non-XMPP component, i.e. the OJC server 110 to the XMPP client devices 116 through the XMPP server 112. The detailed description of broadcasting of the contents to the XMPP client devices 116 using the centralized XMPP-based broadcasting technique (as illustrated in FIG. 3) is explained hereinafter referring to FIG. 1 and FIG. 4 to FIG. 15 as below.

Referring to FIG. 1, in order to enable the transfer of the contents by the web user to the App user, the web user has to initially register the sender device 102 (belonging to the web user) with the web server 106. The web user herein refers to a community, an organization or a group of people. The web user may register the sender device 102 via the web browser 104 shown in FIG. 1.

Figure 4:
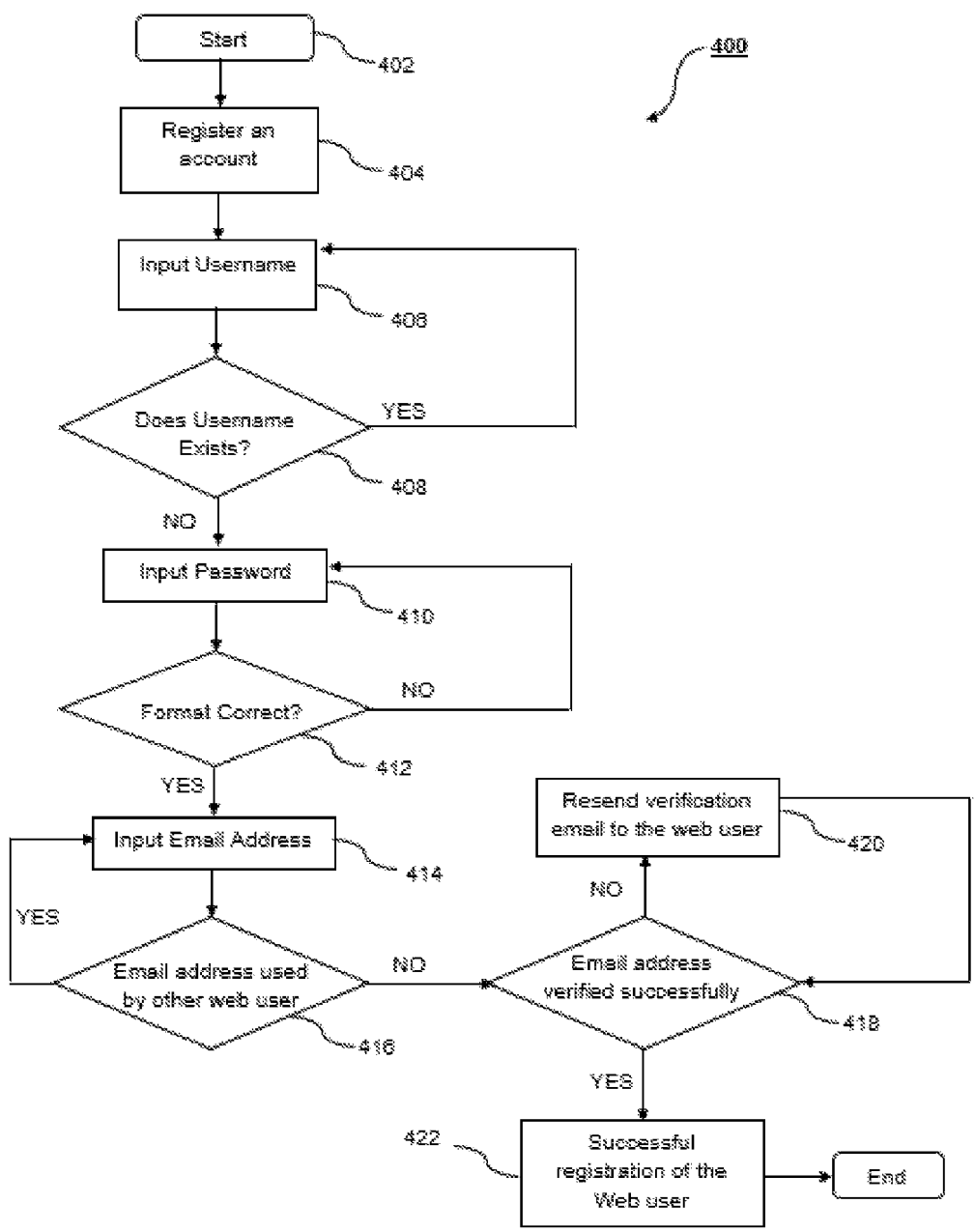
FIG. 4 illustrates a flow diagram 400 showing workflow for registration of a user (i.e. a web user) of a sender device with a web server, in accordance with an embodiment of the present subject matter.

Referring to FIG. 4, a workflow 400 for registration of the web user is illustrated. As shown in FIG. 4, at block 402, the registration process is initiated. At block 404, the web user is prompted to register an account corresponding to the sender device 102 on the web server 106. At block 406, the web user is prompted to input username. At block 408, it is verified whether or not the username provided by the web user already exists in the system. If it is determined at block 408 that the username exists in the system, then the web user is prompted to input a new username at block 406. If it is determined at block 408 that the username provided by the web user does not exist in the system, then at block 410, the web user is further prompted to the input a password. At block 412, the format of the password provided by the web user is checked. If the format of the password provided is correct, then at block 414, the web user is enabled to input an email address. If the format of the password is incorrect, the web user may be prompted to re-enter the password until the password with correct format is obtained. At block 416, the email address provided by the web user is checked to ensure whether or not the same email address is used by other web users. If it is determined that the email address is used by other web user, then the web user is prompted to re-enter the email address that is unique to the web user. If it is determined that the email address is not used by any other web user, then at block 418, the email address of the web user is verified by sending a verification email to the web user on the email address provided. If the email address is not successfully verified, then at block 420, the verification email is resent to the web user and accordingly the email address of the web user is successfully verified. Based upon the successful validation of the email address at block 418, the web user along with the sender device 102 associated to the web user is successfully registered with the web server 106 at block 422 thereby terminating the registration workflow 400.

Similarly, in order to enable receipt of the contents by the App user from the web user, the App user has to initially register the XMPP client device 116 (belonging to the App user) or an XMPP App residing on the said XMPP client device with the XMPP server 112.

Figure 5:
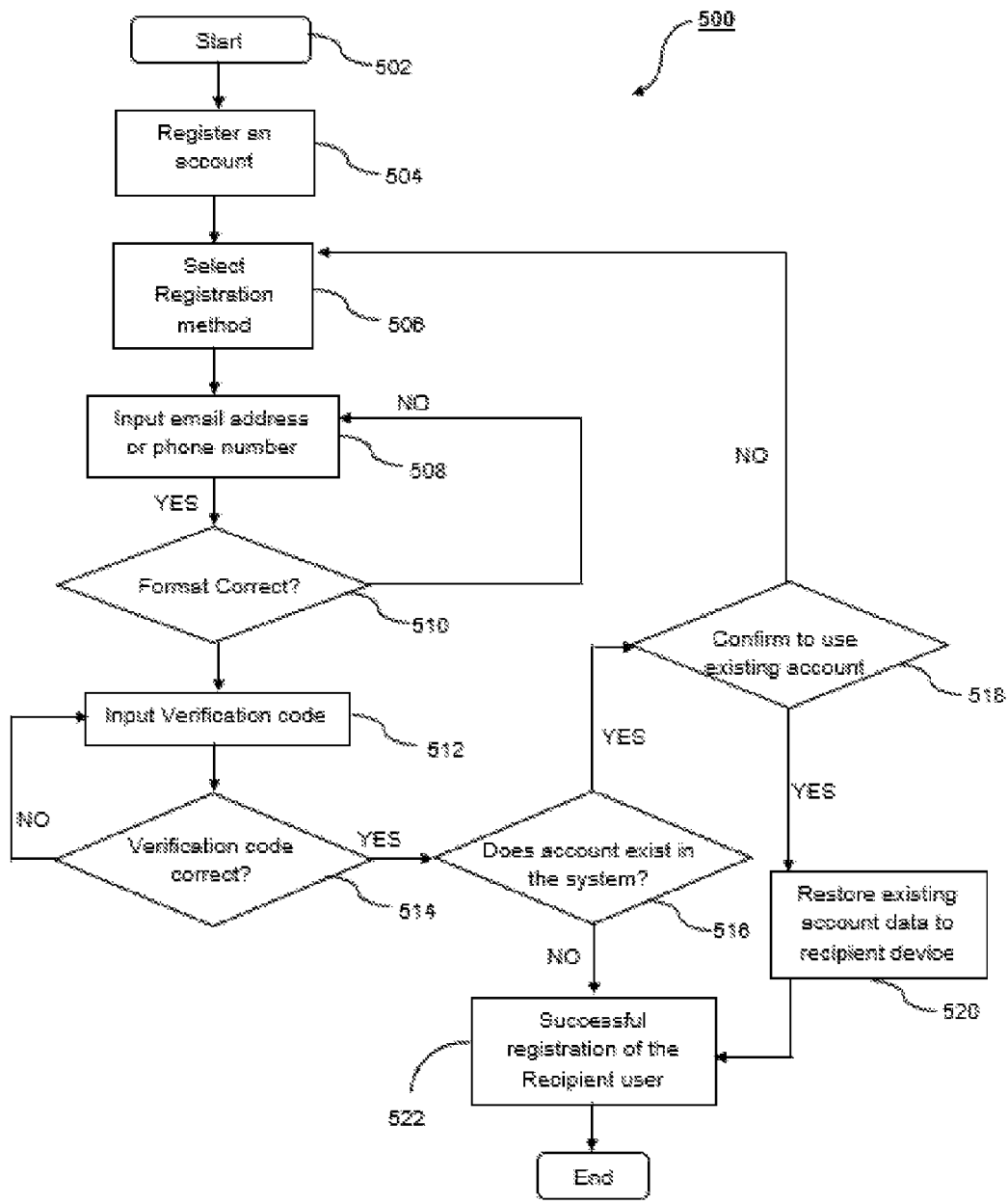
FIG. 5 illustrates a flow diagram 500 showing workflow for registration of a user (App user) of a recipient device (Viz. an XMPP client device) with an XMPP server, in accordance with an embodiment of the present subject matter.

Referring to FIG. 5, a workflow 500 for registration of the App user is illustrated. As shown in FIG. 5, at block 502, the registration process is initiated. At block 504, the App user is prompted to register an account corresponding to the XMPP client device 116 on the XMPP server 112. At block 506, the App user is prompted to select a registration method for registering the XMPP client device 116 and/or the XMPP App on the XMPP client device 116. At block 508, the App user is enabled to provide email address or a phone number based upon the selection of the registration method (Viz. an email registration method or a phone registration method) at block 506. At block 510, the format of the email address or the phone number provided is checked. If the format of the email address or the phone number is correct, then at block 512, the App user is enabled to input a verification code sent at the email address or on the phone number. If the format of the of the email address or the phone number is incorrect, the App user may be prompted to re-enter the email address or the phone number until the correct format of the of the email address or the phone number is provided. At block 514, the verification code provided by the App user is checked. If it is determined that the verification code provided by the App user is incorrect, the App user may be prompted to re-enter the correct verification code. If is determined at block 514 that the verification code provided by the App user is correct, then at block 516, it is checked whether an account already exists corresponding to the App user on the XMPP server 112. If there is already an account corresponding to the App user, then at block 518, the App user may be prompted to confirm the use of existing account. If the App user confirms to use the existing account, then at block 520, the account data related to the existing account of the App user is restored to the XMPP client device 116 of the App user. Based upon the successful restoration of the account data at block 520 or determination of unavailability of the existing account at block 516, the App user along with the XMPP client device 116 and/or XMPP App on the XMPP client device 116 is successfully registered with the XMPP server 112 at block 522 thereby terminating the registration workflow 500.

Figure 6:
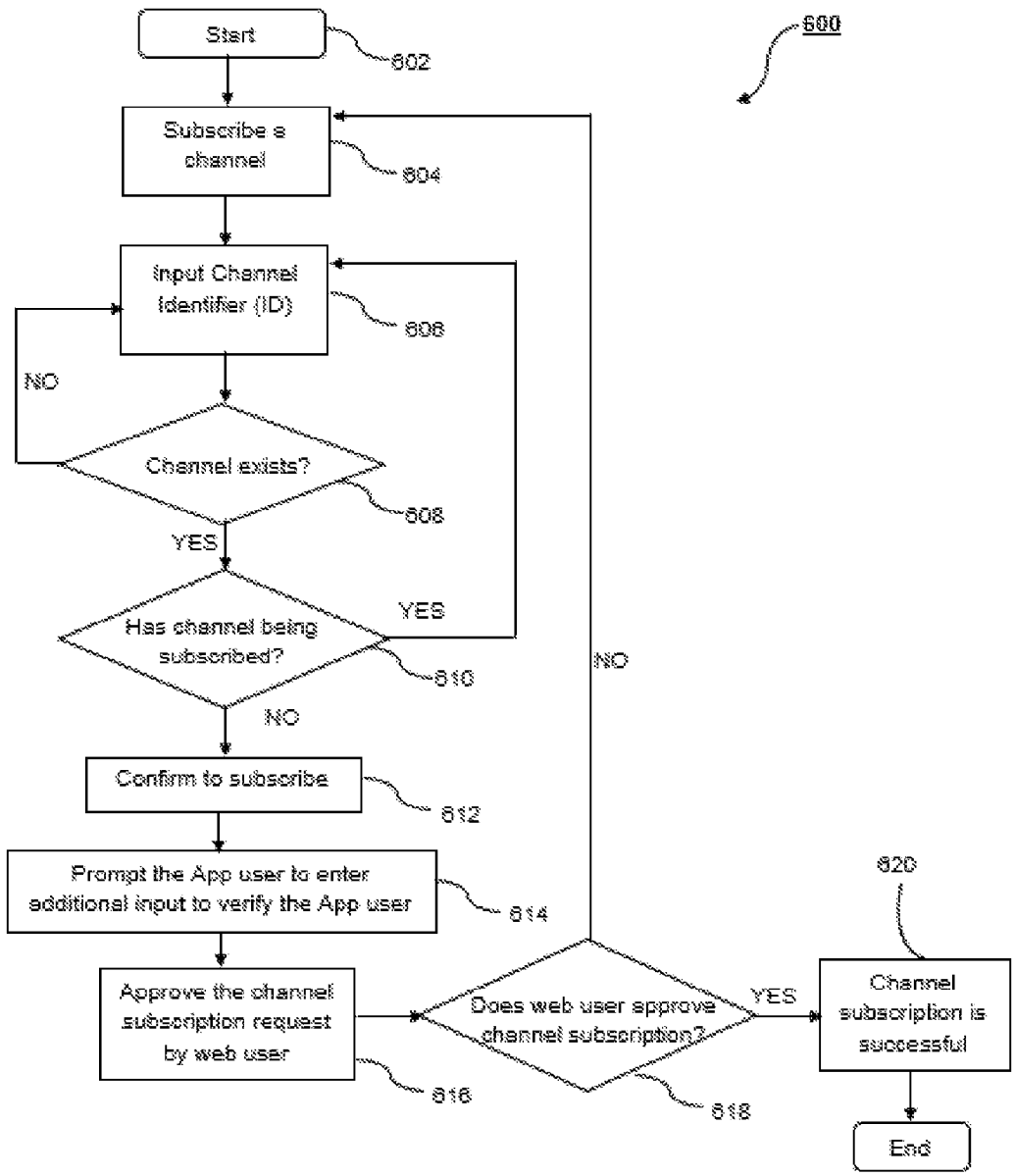
FIG. 6 is a flow diagram 600 showing workflow for subscription of a channel, by the App user, belonging to the web user, in accordance with an embodiment of the present subject matter.

Now again referring to FIG. 1, based upon the successful registration of the web user 102 with the web server 106, the web user 102 may submit a broadcasting request to the web server 106 via the web browser 104. Particularly, the web user may login to the web server 106 through the web browser 104. In an embodiment, the broadcasting request may comprise one or more contents along with metadata associated to the one or more contents. The one or more contents are to be broadcasted to at least one XMPP client device 116 over a channel belonging to the web user 102. The channel herein indicates a communication relation between the web user 102 and the at least one XMPP client device 116. The communication relation is also referred as "Audience", wherein the communication relationship is used to transfer the contents from both the web user to the XMPP client device 116 and vice versa. In an aspect, the relationship is many-to-many relationship. That is, a single channel belonging to a single web user may be subscribed by multiple XMPP client devices 116. It is to be noted that the App user 116, based upon the successful registration with the XMPP server 114, may submit a subscription request to the web user 102 in order to subscribe the channel associated to the web user 102. The web user 102 may approve the subscription request from the App user 116. FIG. 6 illustrates a flow diagram 600 depicting workflow for subscription of the channel, by a user (i.e. App user) associated to the XMPP client device 116, wherein the channel being subscribed belongs to a user (i.e. web user) associated to the sender device 102.

As shown in FIG. 6, at block 602, the process for subscription of the channel is initiated. At block 604, the App user may subscribe a channel of the web user. At block 606, the App user may be prompted to input a channel identifier (ID) corresponding to the channel being subscribed by the App user. At block 608, it is checked whether or not the channel corresponding to the channel ID exists. If it is determined at block 608 that there is no channel in existence corresponding to the channel ID, then the App user is prompted to re-enter the channel ID pertaining to the valid channel that is in existence. If it is determined at block 608 that the channel corresponding to the channel ID exists and is a valid channel, then at block 610, it is verified whether or not the App user has subscribed the channel. If the App user has already subscribed the channel, then the App user is prompted to enter the channel ID corresponding to the channel subscribed and thereby the web user and the App user are connected via the channel subscribed in order to enable transfer of data between the web user and the App user. However, if is determined at block 610 that the App user has not subscribed the channel, then at block 612, the App user is enabled to transmit a channel subscription request to the web user in order subscribe and/or confirm the channel belonging to the said web user. At block 614, based upon the confirmation of the channel, the App user may be prompted to provide an additional input in order to verify the App user. In one example, the App user may be prompted to input name of the App user, or an identifier identifying the App or a personal identification number (PIN) previously provided to the App user by the Web user. At block 616, the web user may approve the channel subscription request. At block 618, it is checked whether or not the web user has approved the channel subscription request from the App user. If it is determined at block 618 that the web user has not approved the channel subscription request, the afore-mentioned process (blocks 604-618) of subscription of the channel is iteratively performed until the web user approves the channel subscription request of the App user. If it is determined at block 618 that the web user has approved the channel subscription request, the channel subscription is successful at block 620 thereby terminating the workflow 600 for the channel subscription.

It must be understood that each web user 102 has a separate and/or unique channel for broadcasting the contents belonging to the respective web user. Further, each App user has to subscribe to the respective channel of the respective web user in order to establish communication relationship between the App user and the web user for broadcasting the contents. In one aspect, the contents herein may refer to advertisements and marketing/promotional messages on various products/solutions offered by the web users who predominately are enterprises and/or business organizations.

As described above, the web server 106 may receive the broadcasting request comprising the one or more contents and the metadata associated to the one or more contents. In one example, the one or more contents indicate messages to be broadcasted to the XMPP client device 116. Further, the metadata may comprise the identifier pertaining to the XMPP client device 116 (and thereby App user identity) and a scheduled time for initiating the transfer of the messages to the App user. It is to be noted that the broadcasting request is generated by the web user by selecting the App user from the address book memory of the sender device 102, inputting the contents/messages to be broadcasted to the App user selected and setting the scheduling time for the broadcasting of the contents/messages. The broadcasting request may be stored in the content repository 108 coupled with the web server 106 as shown in FIG. 1. In one embodiment, the content repository 108 is a database containing different data tables to store the data (i.e. contents and metadata related to the contents).

Now again referring to FIG. 1, the task scheduling device 114 may be configured to trigger the broadcasting of the contents/messages stored in the content repository 108 to the XMPP client device 116 as per the scheduling time set in the broadcasting request of the contents/messages. The task scheduling device 114 is a middleware device and/or application configured to update the content repository 108 based upon the status of the transmit/receipt of contents/messages in the content repository 108. In an embodiment, the task scheduling device 114 may notify the XMPP client device 116 to trigger a connection request from the XMPP client device 116 to the XMPP server 112 for the retrieval of the contents/messages. Particularly, the task scheduling device 114 may send a notification message to the App user on the XMPP client device (or the XMPP App), wherein the notification message indicates the App user to login the XMPP server 112 and retrieve the messages/contents scheduled for broadcast to the App user. The transfer of the contents/messages in enabled via a connection established between the OJC server 110 and the XMPP client device 116 explained in detail hereinafter.

The OJC server 110 may be configured to manage retrieval of contents/messages from the content repository 108 and transfer the contents/messages to the XMPP client device 116 via the XMPP server 112. The OJC server 110, via the XMPP server 112, may be configured to receive the connection request from the at least one of the XMPP client devices 116. The OJC server 110 include a cluster of computing nodes (or external components/machines) collectively performing the tasks of retrieval of contents from the content repository 108 and transfer the contents to the XMPP client devices 116. The OJC server 110 may comprise 'N' number of computing nodes, wherein N>1. Each of the components has an identical configuration and database sessions amongst peer components or a node. The cluster design enables balancing connections via a load balancing algorithm amongst servers and provide failover support. The load balancing algorithm executed by the cluster of computing nodes is explained in detail as below.

The cluster of computing nodes comprises a first node (hereinafter referred as a master node) and a plurality of slave nodes (hereinafter referred as working nodes). The first node or the master node is adapted to assign a task to each working node to retrieve and transfer contents/messages corresponding to at least one of the XMPP client devices 116. The assignment of the task to the working nodes is based on the load balancing algorithm. As described above, the master node manages the working nodes and hence is not responsible to perform the task of contents retrieval and transfer thereof to one of the XMPP client devices 116. In a scenario wherein the master node is dead or non-performing, then one of the working nodes is designated as the master node which manages the other working nodes. The master node may be configured to fetch contents/messages in the content repository 108 present in a table referred as "batch" having status="NEW_ENTRY". It must be understood that each batch include bulk messages sent by the web user to the App user. Therefore, the total recipients in each batch is distinct from the other batches.

Figure 8:
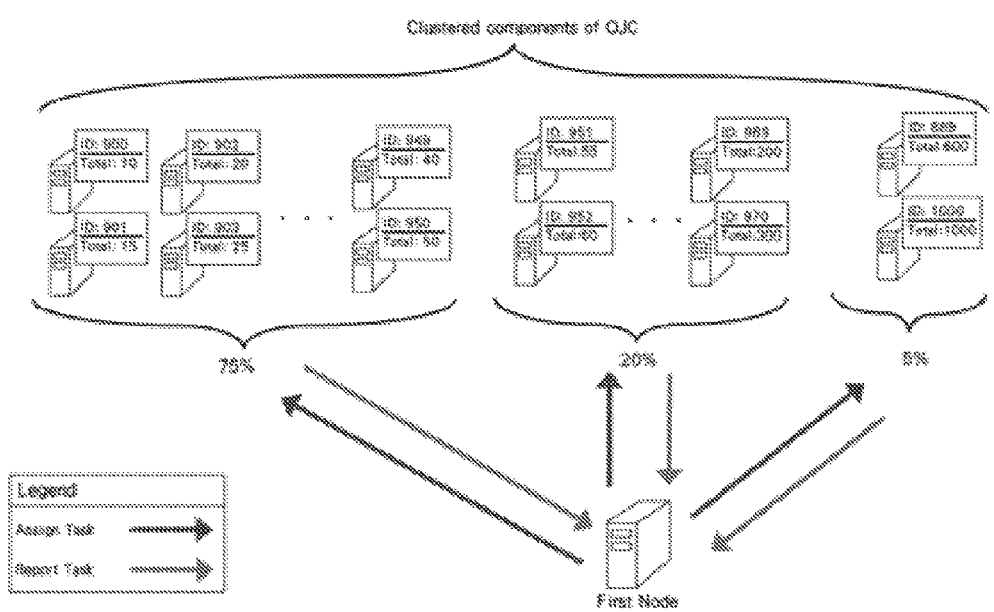
FIG. 8 is a diagram illustrating distribution of tasks amongst clustered nodes/components/machines of the OJC server, in accordance with an embodiment of the present subject matter.

The master node may categorize the total recipients into three different batches namely small samples, medium samples and large samples. In one exemplary embodiment, the small samples may include 1-50 recipients, the medium samples may include 51-500 recipients and the large samples may include more than 500 recipients. The master node may then assign these small, medium and large samples to the working nodes for execution. In one embodiment, a percentage of recipients, of the total recipients, categorized into the categories of the small samples, the medium samples and the large samples are approximately 75%, 20% and 5% respectively. FIG. 8 is a block diagram illustrating distribution of tasks amongst clustered nodes/components of the OJC server 110, in accordance with an embodiment of the present subject matter. It is to be noted that the working nodes are adapted to prioritize processing the contents/messages pertaining to recipients categorized as small samples, even though the medium samples and the large samples wait in a queue for processing. This is because, the processing of the small samples may be completed in lesser time and are easier to be notified having delay from view of web user usage experience. In one extreme scenario, 100% of the working nodes may be assigned to handle small samples. A dedicated working node may be configured to handle a rare scenario of having the large samples. The dedicated working node allocation for the large samples enable the dedicated working node to handle/process this particular batch of large samples only, so unnecessary context switch among nodes is avoided. The master node may allocate the remaining working nodes to handle the medium samples. It is to be noted that once the processing of the batch is completed, the status of the batch is updated as "COMPLETED", and the said batch will not be processed again. As-soon-as the working node completes the assigned task, the working nodes updates the completion status to the master node and waits for further allocation of subsequent task by the master node.

Figure 7:
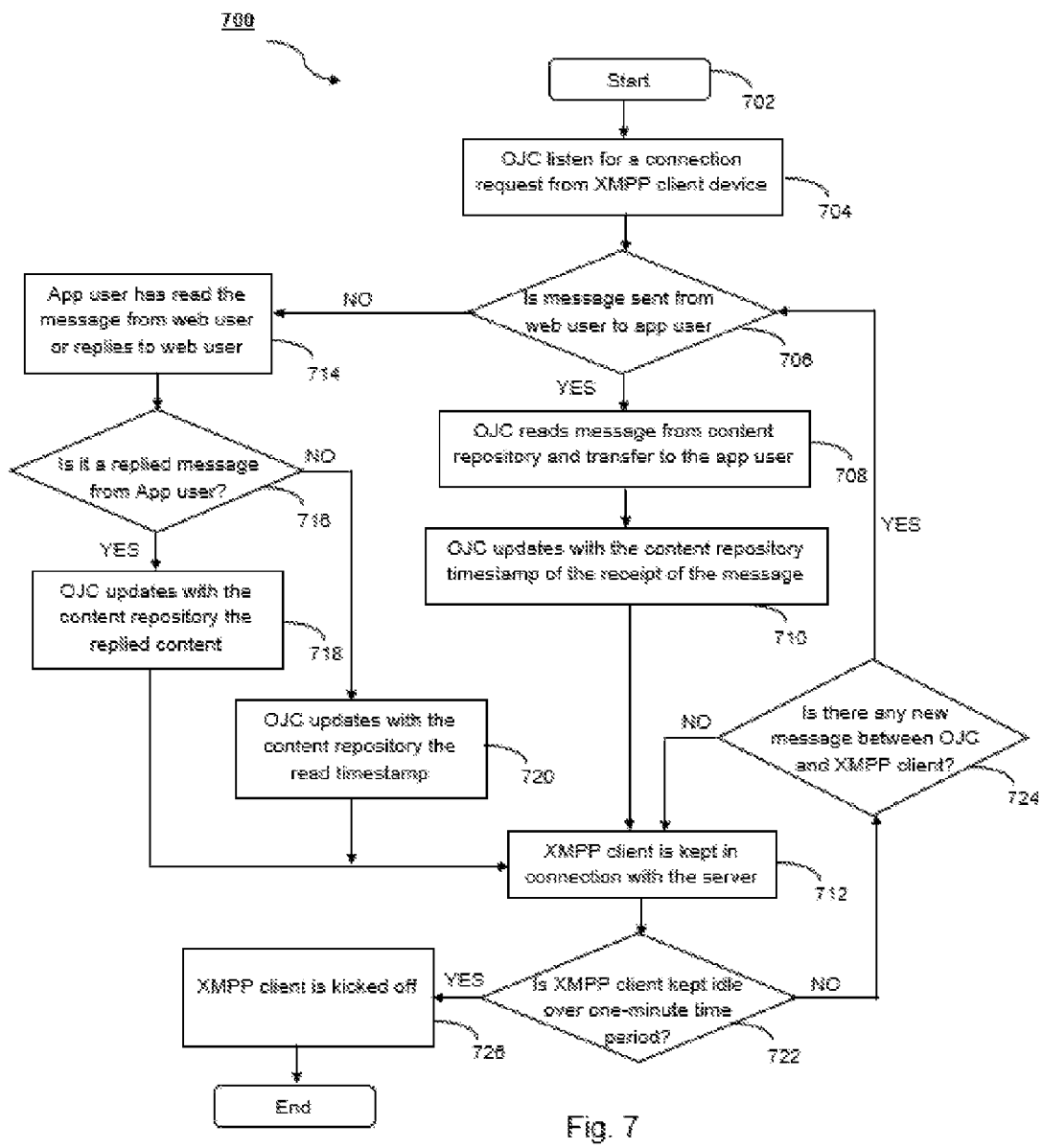
FIG. 7 illustrates a flow diagram 700 depicting steps pertaining to communication between the OJC server and the XMPP client device, in accordance with an embodiment of the present subject matter.

The task allocated to each of the working nodes is the retrieval and transfer of the contents/messages to the at least one XMPP client device 116 after the receipt of the connection request by the OJC server 110 from the said at least one XMPP client device 116. The execution of the aforementioned tasks by the working nodes, on behalf of the OJC server 110, is facilitated through a communication established between the OJC server 110 and the XMPP client device 116. FIG. 7 is a flow diagram 700 depicting steps pertaining to the communication between the OJC server 110 and the at least one XMPP client device 116.

As shown in FIG. 7, at block 702, the process for facilitating the communication between the OJC server 110 and the XMPP client device 116 is initiated. At block 704, the OJC server 110 may listen a connection request from the XMPP client device 116. At block 706, the OJC server 110 may check whether a message is sent from the web user to the App user. If it is determined at block 706 that the message is sent from the web user to the App user, then at block 708, the OJC server 110 may read the message from the content repository 108 and transfer the message to the App user. At block 710, the OJC server 110 may update the content repository 108 with a timestamp pertaining to the receipt of the message by the App user. At block 712, the XMPP client device 116 may be kept in connection with the OJC server 110. If it is determined at block 706 that the message is not sent from the web user to the App user, then at block 714, the App user may either read or reply the message received from the web user. At block 716, it is verified whether the App user has read the message or replied to the message. If it is determined at block 716 that the App user has read the message, then at block 718, the OJC server 110 may update the content repository 108 with a content pertaining to reply made by the App user corresponding to the message received from the web user. Alternatively, at block 720, the OJC server 110 may update the content repository 108 with a timestamp pertaining to the message being read by the App user. It is to be noted that the timestamp, recorded in the content repository, indicates a message reaching time to the XMPP App or XMPP client device 116. After the update of the content repository 108 with either of the replied content or timestamp, the process proceeds to the block 712 wherein the XMPP client device 116 is kept in connection with the OJC server 110. At block 722, it is checked whether the XMPP client device is idle (i.e. the App user is neither reading nor replying the message received from the web user) for a predefined time period greater than one minute. If the XMPP client device is not idle for the time period greater than one minute, then at block 724, it is checked whether there is any new connection request from the XMPP client device 116 to the OJC server 110 for the receipt of new message from the web user. If it is determined at block 724 that there is a new connection request, then the process steps from block 706 are repeated until no new connection request is detected. If it is determined at block 724 that there is no new connection request, then the process proceeds to block 712. If is determined at block 722 that the XMPP client device is idle for the time period greater than one minute, then at block 726, the XMPP client device 116 is automatically kicked-off from the connection with the OJC server 110 thereby terminating the communication between the OJC server 110 and the XMPP client device 116.

It must be understood that the OJC server 110 may communicate with the XMPP client devices 116 through the XMPP server 112. The master node may assign a dedicated communication session for each working node, wherein the dedicated communication session facilitates communication between the respective working node and the XMPP server 112. In one embodiment, the communication session is a TCP session. More particularly, the TCP session enables transfer of contents/messages from the working node to the respective XMPP client device 116. The working node connects with the XMPP server 112 via a communication port (e.g. port number 843) of the XMPP server 112 in order to transfer the contents/messages. The communication port is configured to listen an incoming connection request from the working node. In an embodiment, the connection established between the working node and the XMPP server 112 via the communication port is a socket connection following the specification prescribed by XMPP standards, i.e. "XEP-0114: Jabber Component Protocol." The details of the communication between the working node and the XMPP server 112 is hereinafter described referring to FIG. 9.

Figure 9:
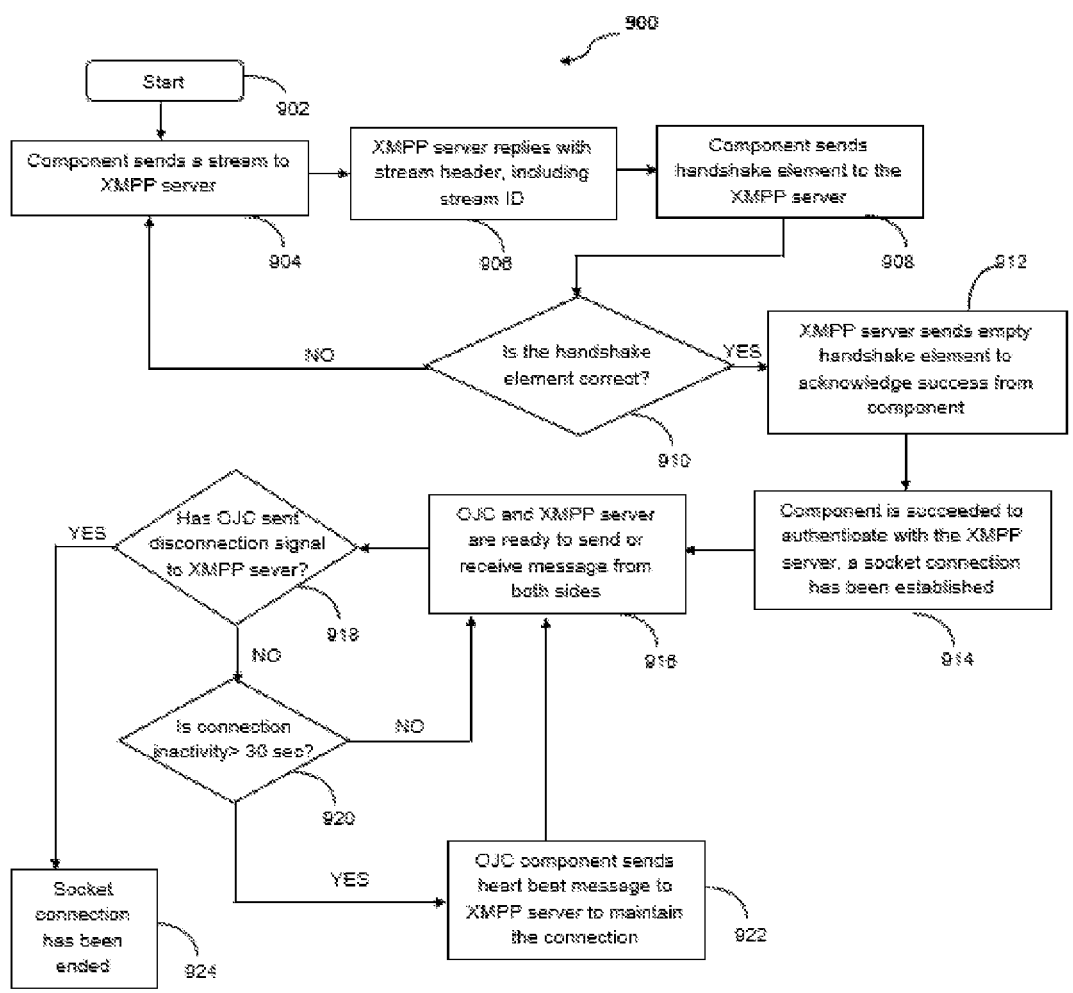
FIG. 9 illustrates a flow diagram 900 depicting steps pertaining to communication between the external component/node/machine of the OJC server and the XMPP server, in accordance with an embodiment of the present subject matter.

FIG. 9 is a flow diagram 900 depicting steps pertaining to communication between the node (i.e. a working node/component) of the OJC server 110 and the XMPP server 112. As shown, at block 902, the communication between the working node and the XMPP server 112 is initiated via a dedicated TCP session established over a communication port 843. At block 904, the working node may transmit a stream to the XMPP server 112. In one embodiment, the format of the stream transmitted by the working node is as below:

<stream:stream
xmlns='jabber:component:accept'
xmlns:stream='http://etherx.jabber.org/streams'
to='xxx.192.1.1.1'>;

Wherein, "xxx.192.1.1.1" indicates an agent of the XMPP server 112 to handle with the component/working node composed of a name and a server IP.

At block 906, after the receipt of the stream, the XMPP server 112 may reply to the component/working node by transmitting a stream header to the component/working node. The stream header may comprise a stream identifier (stream ID) pertaining to the stream received from the component/working node. In one embodiment, the format of the stream header transmitted to the component/working node by the XMPP server 112 is as below:

<stream:stream
xmlns:stream='http://etherx.jabber.org/streams'
xmlns='jabber:component:accept'
from='xxx.192.1.1.1'
id='[StreamID]'>

At block 908, the component/working node may transmit a handshake element in form of a handshake signal to the XMPP server 112. In an embodiment, XML character data of the handshake element may be computed based upon at least the stream identifier (Stream ID) concatenated with a pre-shared secret key. In one embodiment, the format of the handshake signal comprising the stream ID concatenated with the secret key is as below:

<handshake>aaee83c26aeeafcbabeabfcbcd50df997e0a2a1e</handshake>

At block 910, it is checked whether the handshake element received is correct. If it is determined that the handshake element received is incorrect, then the process proceeds to block 904. If it is determined that the handshake element received is correct, then at block 912, the XMPP server 112 may transmit an empty handshake element in form of an acknowledgement signal, corresponding to the above handshake signal, to the component/working node. The acknowledgement signal is transmitted to indicate successful connection being established between the XMPP server 112 and the said component/working node. In one embodiment, the format of the empty handshake element (i.e. the acknowledgement signal) is as below:

<handshake/>

At block 914, based upon the receipt of the acknowledgement signal, the authentication of the component/working node with the XMPP server 112 is successful thereby establishing a socket connection between the component/working node and the XMPP server 112. At block 916, after the establishment of the socket connection, both the XMPP server 112 and the OJC server 110 are ready to send and/or receive messages/contents to each other via the socket connection established.

At block 918, it is checked whether the OJC server 110 has sent a disconnection signal to the XMPP server 112. If it is determined at block 918 that the OJC server 110 has not sent the disconnection signal, then at block 920, it is verified whether the connection between the OJC server 110 and the XMPP server 112 is inactive, due to lack of transfer of contents/messages, for a time period greater than 30 seconds. If it is determined at block 920 that the connection is inactive for the time period greater than 30 seconds, then at block 922, the OJC server 110 transmits a heartbeat message to the XMPP server 112 to maintain the socket connection in order to facilitate the transfer of messages/contents from the OJC server 110 to the XMPP server 112 and vice versa. If it is determined at block 918 that the OJC server 110 has sent the disconnection signal, then at block 924, the socket connection between the component/working node and the XMPP server is terminated.

It must be understood that the component/working node of the OJC server 110 may transfer a message, intended for a XMPP client device 116, to the agent of the XMPP server first and thereafter redirect the message to the XMPP client device 116. In one embodiment, the message transferred to the XMPP client device 116 is as below:

<message
from="xxx.192.1.1.1"
to="john.lee\40abc.com@192.168.1.84"
type="chat">
<body>[content]</body>
</message>

Wherein, john.lee\40abc.com" is the destined XMPP client device and [content] is messaging content.

Similarly, if there is a response content corresponding to the messaging content from the XMPP client device 116, the said response content is transferred by the XMPP client device 116 to the XMPP server 112. The XMPP server 112 then redirects the response content to the component/working node, of the OJC server 110, which ultimately inserts the response content in the content repository 108. In one embodiment, the response content transferred from the XMPP client device 116 is as below:

<message
to="xxx.192.168.1.84">
<body>[content]</body>
</message>

Wherein, the [content] is a response content from the XMPP client device 116.

It must be understood that the component/working node of the OJC server 110 may be configured to update the content repository regarding the receipt of the response content, corresponding to the contents/messages, or the contents/messages being accessed by the XMPP client device 116 or a combination thereof. The XMPP client device 116 may be triggered by the task scheduling device 114 to login the XMPP server 112 in order retrieve to the messages/contents destined for the respective client device 116. Alternatively, the XMPP App is configured to automatically login, without receiving the trigger/notification from the task scheduling device 114, with the XMPP server 112 as-soon-as the XMPP client device 116 is unlocked or an internet connection (e.g. WI-FI or 2G/3G/4G) is available or the XMPP App on the XMPP client device 116 is started.

In one embodiment, the XMPP client device 116 may login to the XMPP server 112 via a dynamic password generated using a dynamic password generation technique. The XMPP server 113 may authenticate the XMPP client device 116 based on the dynamic password as-well-as an AppUsername (e.g. email address, mobile number etc.) provided by the App user in order to access the XMPP server 112. In one embodiment, the dynamic password may be generated in a real time for a current login session initiated between the XMPP server 112 and the XMPP client device 116. In this embodiment, the dynamic password may be generated based upon at least one of a recipient identifier (i.e. an identifier associated to the App user), a content identifier associated to a last content retrieved by the recipient device, a timestamp corresponding to last login session between the XMPP server 112 and the XMPP client device 116, and a combination thereof. In one example, the password string generated for each login session is based on formula (1) as below:

Password string=MD5 [substr (AppUsername, 10)+
Last MessageID+Last Login Timestamp]     Formula (1)

Wherein,

AppUsername is a registered username pertaining the App User. It is to be noted that the AppUsername is a constant string generated after the registration of the App user.

MessageID: It is a unique content/message identifier corresponding to each content/message. The content/message identifier may be synchronized at both the XMPP server 112 and the XMPP client device 116 via HTTP synchronized transmission.

Login Timestamp: Indicates a timestamp recorded at both the XMPP server 112 and the XMPP client device 116 during each XMPP authentication.

It is to be noted that the above formula (1) may be updated/modified/changed according to the App version update each time in order to increase the complexity of password string formation.

Based upon successful authentication of the XMPP client device 116 by the XMPP server 112, the XMPP client device 116 may retrieve the contents/messages destined for the XMPP client device 116. The XMPP client device 116 may be kicked-off by the XMPP server 112 if the XMPP client device 116 is inactive for a predefined time period (e.g. say 1 minute). Particularly, the XMPP server 112 may be programmed to select the XMPP client devices 116 who are online and have fetched contents/messages for a predefined time interval (e.g. two minutes) and thereafter the said XMPP client devices 116 are still connected without any activity over a predefined time period (e.g. one minute or more). Such XMPP client devices 116 selected are kicked-off by the XMPP server 112. The kicking off the inactive XMPP client devices 116 enables reduction in burden of the system resources and thereby facilitates in saving battery service time of the devices.

The web user 102 may be configured to retrieve via the web browser 104 latest delivery report from the content repository 108 by refreshing the web page rendered on the sender device 102. The latest delivery reports may display the status of the contents/messages delivered to the respective XMPP client devices 116. In one aspect, the system 100 may be capable of sending bulk messages and retrieving up to 50000 App users' delivery results through the web browser implementing a full-load-paging algorithm to achieve a prompt response to the web user. The Full-Load-Paging algorithm is further described as below.

The web user 102 via the web portal 302 (shown in FIG. 3) may be configured to perform bulk loading from the content repository 108. For example, the web user 102 may load up to 50,000 entries such as address book retrieval, delivery results across several months and perform statistics analysis. In order to enable a prompt visual response for the web user during bulk loading, the system 100 implements the Full-Load-Paging algorithm as below:

According to the Full-Load-Paging algorithm implemented by the system 100, the total entries to be loaded may be calculated first and categorized accordingly into two types including small samples and large samples. It is to be noted that each small sample contain 1-500 entries, whereas each large sample may contain more than 500 entries. For the entries categorized as a small sample, the system 100 may retrieve data from the content repository 108 and may calculate sub-total statistics for each entry. The system 100 may then write the data into data tables, of the content repository, which is a plug-in for the jQuery javascript library. Since the entries in the small sample are less than 500, the data retrieval time for retrieving the data from the content repository 108 as-well-as the processing time to write the data into the data tables is insignificant to the web user. It is to be noted that the data retrieval time and the processing time collectively is less than total 1 second. It must be understood that the data when fully loaded into the web browser 104, the web user 102 may enjoy prompt visual response during browsing. Every filtering or contextual searching of results may be displayed instantaneously to the web user without requiring the web user to click the search button provided to search for the entries.

For the entries categorized as large sample, the system 100 may read partial entries based on a page unit, wherein a page size containing total entries in the page unit may be defined as per the preferences of the web user. In one example, the web user may set a preference range of 10-50 entries for every page unit. Therefore, since each retrieval may contain only 10-50 entries data per read, the web user is still provided with a prompt visual response. It is to be understood that for each browsing event, the web user may apply filtering or contextual searching operation for facilitating data retrieval from the content repository and thereby enabling processing on the data tables. In order to execute the request for the filtering or contextual searching, the web user may have to click the search button. Though the large sample retrievals perform many web requests, but since the entry number is small, there is no burden to the web server 106 and still a prompt visual response is provided to the web user.

Figure 10:
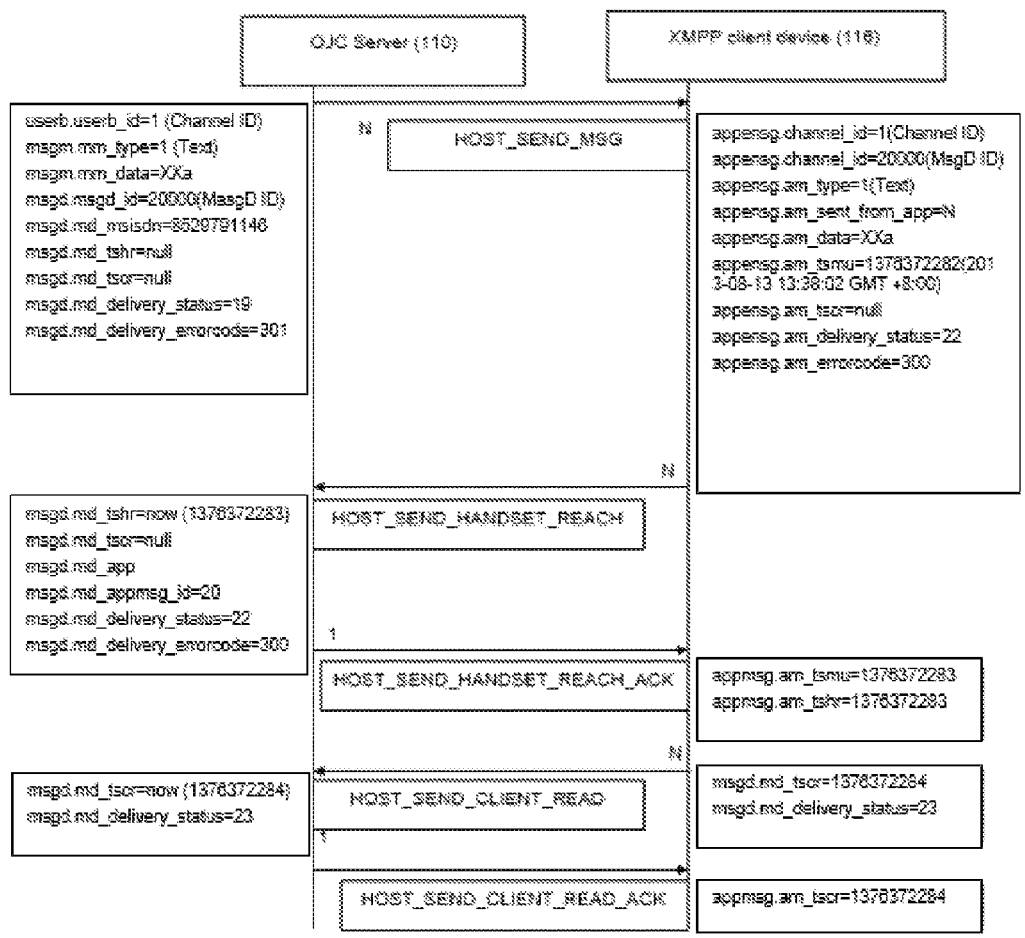
FIG. 10 to FIG. 14 illustrates data packet structures associated to various data packets communicated between the OJC server and the XMPP client device, in accordance with an embodiment of the present subject matter.

It is to be noted that the aforementioned communication between the OJC server 110 and the XMPP client devices 116 is facilitated through data packets represented in JavaScript Object Notation (JSON) format. The structure of each data packet along with its represented in JSON format is further explained in detail referring to FIG. 10, FIG. 11, FIG. 12, FIG. 13 and FIG. 14 as below:

Referring to FIG. 10 is a diagram illustrating exchange of a data packet for sending of a message from the OJC server 110 to the XMPP client device 116 in accordance with an embodiment of the present disclosure. As shown, the sending of the message is facilitated through various commands (exchanged as data packets) including HOST_SEND_MSG, HOS T_SEND_HANDSET_REACH OR HOS T_SEND_HANDSET_REJECT (not shown), HOST_SEND_

HANDSET_REACH_ACK OR HOST_SEND_HANDSET_REJECT_ACK (not shown), HOST_SEND_CLIENT_READ and HOST_SEND_CLIENT_READ_ACK. The structure of each of these commands (and an example therefor) is described hereinafter in subsequent paragraphs:

Command 10:

HOST_SEND_MSG (Indicates that the OJC Server host sends a message to one of the XMPP client App using XMPP protocol. In one exemplary embodiment, the structure of the said command 10 is as below:

| Structure Name | Example |
|---|---|
| CommandName | 10 (HOST_SEND_MSG) |
| HostPacketID | 100 |
| AppUsername | 85297911476 |
| ChannelID | 1 (Meteorsis) |
| MsgDID | 20000 |
| MsgDType | 1 (Text) |
| MsgMContent | -MsgDType = 1<br>Msg-1534<br>-MsgDType = 2<br>{"MsgMMediaFileName":"12e3.png",<br>"MsgMMediaHash":"IVB0...kJggg==",<br>"MsgMContent":"Image Msg",<br>"MsgMMediaMimeType":"png",<br>"MsgMMediaSize":"35"}<br>-MsgDType = 4<br>{"MsgMMediaFileName":"8096.mp4",<br>"MsgMMediaDuration":"1",<br>"MsgMMediaHash":"iVB0...CYII=",<br>"MsgMContent":"Video Msg",<br>"MsgMMediaMimeType":"mp4",<br>"MsgMMediaSize":"424"}<br>-MsgDType = 5<br>{"MsgMMediaFileName":"889ea5.png",<br>"MsgMLocationCenterLatitude":"22.352734",<br>"MsgMLocationLatitude":"22.347535530432065",<br>"MsgMLocationLongitude":"114.14073944091797",<br>"MsgMMediaHash":"iVBOR...CYII=",<br>"MsgMContent":"Location Msg",<br>"MsgMMediaMimeType":"png",<br>"MsgMLocationCenterLongitude":"114.1277",<br>"MsgMLocationZoomLevel":"11",<br>"MsgMMediaSize":"48"} |

The aforementioned command 10 is transferred in JSON format as: {"CommandName":"10","HostPacketID":"100","AppUsername":"85297911476","ChannelID":"1","MsgDID":"20000","MsgDType":"1","MsgMContent":"Msg-1534"}

Command 11:

HOST_SEND_HANDSET_REACH (Indicates that the message has reached the handset (i.e. the XMPP client device) and hence the XMPP client app returns a reach receipt signal to the OJC server host). In one exemplary embodiment, the structure of the said command 11 is as below:

| Structure | Example |
|---|---|
| CommandName | 11 (HOST_SEND_HANDSET_REACH) |
| HostPacketID | 100 |
| AppPacketID | 5 |
| AppUsername | 85297911476 |
| AppMsgID | 20 |
| MsgDID | 20000 |

The aforementioned command 11 is transferred in JSON format as: {"CommandName":"11","HostPacketID":"100","AppPacketID":"5","AppUsername":"85297911476","AppMsgID":"20","MsgDID":"20000"}

Command 12:

HOST_SEND_HANDSET_REACH_ACK (Indicates that the OJC server host received the packet "HOST_SEND_ HANDSET_REACH", and hence the said OJC server host returns an acknowledgement thereof to the XMPP client app). In one exemplary embodiment, the structure of the said command 12 is as below:

| Structure | Example |
|---|---|
| CommandName | 12 (HOST_SEND_HANDSET_REACH_ACK) |
| AppPacketID | 5 |
| AppUsername | 85297911476 |
| MsgDID | 20000 |
| HandsetReachTimestamp | 1376372282 |

The aforementioned command 12 is transferred in JSON format as: {"CommandName":"12","AppPacketID":"5","AppUsername":"85297911476","MsgDID":"20000","HandsetReachTimestamp":"1376372282"}

Command 13:

HOST_SEND_HANDSET_REJECT (Indicates that the message has reached the handset (i.e. XMPP client device) but the message has been rejected (e.g. due to deactivation of the channel). In one exemplary embodiment, the structure of the said command 13 is as below:

| Structure | Example |
|---|---|
| CommandName | 13 (HOST_SEND_HANDSET_REJECT) |
| HostPacketID | 100 |
| AppPacketID | 5 |
| AppUsername | 85297911476 |
| MsgDID | 20000 |
| RejectErrorCode | 332 |

The aforementioned command 13 is transferred in JSON format as: {"CommandName":"13","HostPacketID":"100","AppPacketID":"5","AppUsername":"85297911476","MsgDID":"20000","RejectErrorCode":"332"}

Command 14:

HOST_SEND_HANDSET_REJECT_ACK (Indicates that the OJC server host has received the packet—"HOST_SEND_HANDSET_REJECT.", hence the OJC server sends an acknowledgement thereof to the XMPP client App). In one exemplary embodiment, the structure of the said command 14 is as below:

| Structure | Example |
|---|---|
| CommandName | 14 (HOST_SEND_HANDSET_REJECT_ACK) |
| AppPacketID | 5 |
| AppUsername | 85297911476 |
| MsgDID | 20000 |
| HandsetRejectTimestamp | 1376372282 |

The aforementioned command 14 is transferred in JSON format as: {"CommandName":"14","AppPacketID":"5","AppUsername":"85297911476","MsgDID":"20000","HandsetRejectTimestamp":"1376372282"}

Command 15:

HOST_SEND_CLIENT_READ (Indicates that the message has been read by the XMPP client device and hence the XMPP client device returns the read receipt to the OJC server host). In one exemplary embodiment, the structure of the said command 15 is as below:

| Structure | Example |
|---|---|
| CommandName | 15 (HOST_SEND_CLIENT_READ) |
| AppPacketID | 6 |
| AppUsername | 85297911476 |
| AppMsgID | 20 |
| MsgDID | 20000 |

The aforementioned command 15 is transferred in JSON format as: {"CommandName":"15","AppPacketID":"6","AppUsername":"85297911476","AppMsgID":"20","MsgDID":"20000"}

Command 16:

HOST_SEND_CLIENT_READ_ACK (Indicates that the OJC server host has received the packet—"HOST_SEND_CLIENT_READ.", hence the OJC server host sends an acknowledgement thereof to the XMPP client App). In one exemplary embodiment, the structure of the said command 16 is as below:

| Structure | Example |
|---|---|
| CommandName | 16 (HOST_SEND_CLIENT_READ_ACK) |
| AppPacketID | 6 |
| AppUsername | 85297911476 |
| MsgDID | 20000 |
| HandsetReachTimestamp | 1376372282 add back |
| ClientReadTimestamp | 1376372284 |

The aforementioned command 16 is transferred in JSON format as: {"CommandName":"16","AppPacketID":"6","AppUsername":"85297911476","MsgDID":"20000","ClientReadTimestamp":"1376372284"}

Figure 11:
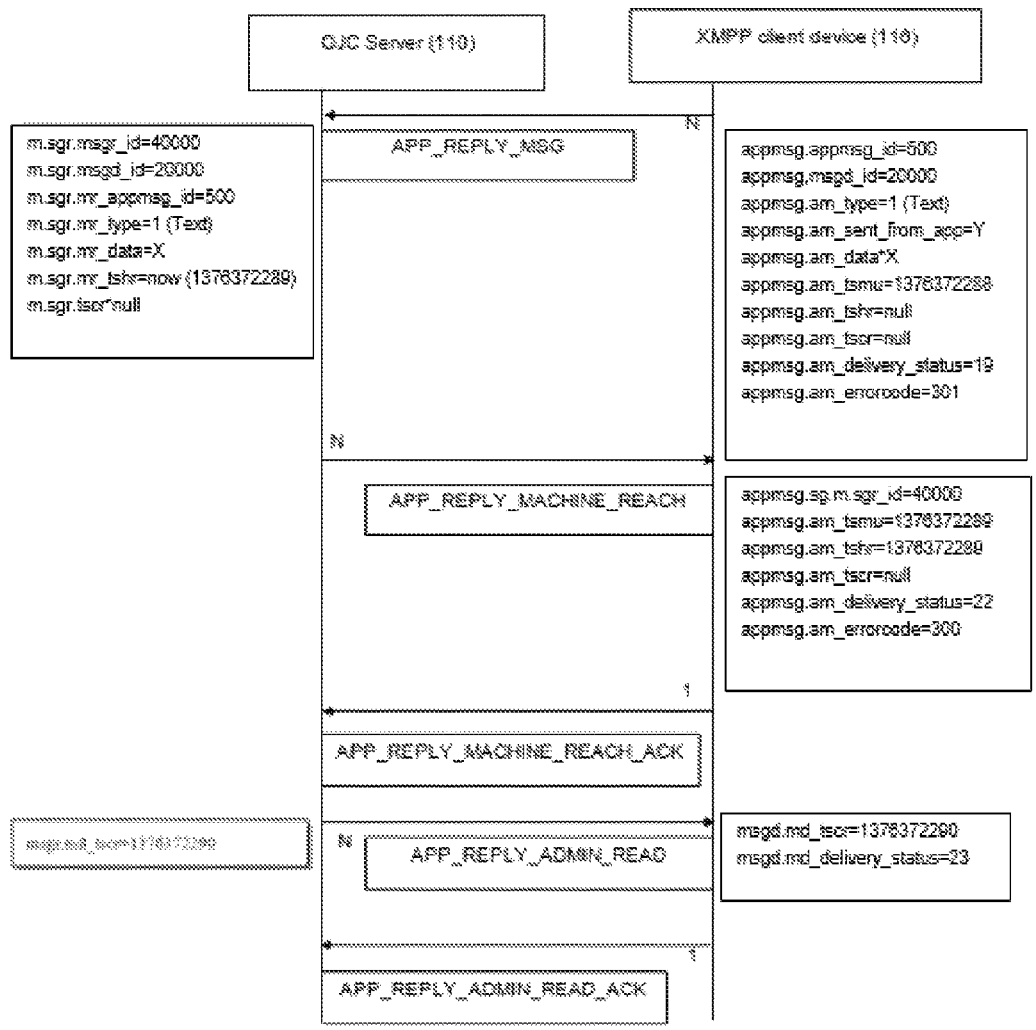

Referring to FIG. 11 is a diagram illustrating exchange of a data packet indicating a reply message from the XMPP client device 116 to the OJC server 110, in accordance with an embodiment of the present disclosure. As shown, the reply message is facilitated through various commands (exchanged as data packets) including APP_REPLY_MSG, APP_REPLY_MACHINE_REACH OR APP_REPLY_MACHINE_REJECT (not shown), APP_REPLY_MACHINE_REACH_ACK OR APP_REPLY_MACHINE_REJECT_ACK (not shown), APP_REPLY_ADMIN_READ, and APP_REPLY_ADMIN_READ_ACK. The structure of each of the commands (and an example therefor) is described hereinafter in subsequent paragraphs:

Command 20:

APP_REPLY_MSG (Indicates that the XMPP client App replies with a message to the OJC server). In one exemplary embodiment, the structure of the said command 20 is as below:

| Structure Name | Example |
|---|---|
| CommandName | 20 (APP_REPLY_MSG) |
| AppPacketID | 7 |
| AppUsername | 85297911476 |
| MsgDID | 20000 |
| AppMsgID | 500 |
| AppMsgType | 1 (Text) |
| AppMsgContent | replies message |

The aforementioned command 20 is transferred in JSON format as: {"CommandName":"20","AppPacketID":"7","AppUsername":"85297911476","MsgDID":"20000","AppMsgID":"500","AppMsgType":"1","AppMsgContent":"replies message"}

Command 21:

APP_REPLY_MACHINE_REACH (Indicates that the message from the XMPP client has reached the OJC server host which acknowledges the receipt of the message. In one exemplary embodiment, the structure of the said command 21 is as below:

| Structure | Example |
|---|---|
| CommandName | 21 (APP_REPLY_MACHINE_REACH) |
| HostPacketID | 101 |
| AppPacketID | 7 |
| AppUsername | 85297911476 |
| AppMsgID | 500 |
| MsgRID | 40000 |
| MachineReachTimestamp | 1376372288 |

The aforementioned command 21 is transferred in JSON format as: {"CommandName":"21","HostPacketID":"101","AppPacketID":"7","AppUsername":"85297911476","AppMsgID":"500","MsgRID":"40000","MachineReachTimestamp":"1376372288"}

Command 22:

APP_REPLY_MACHINE_REACH_ACK (Indicates that the XMPP client App has received the packet—"APP_REPLY_MACHINE_REACH", hence the XMPP client App returns an acknowledgement thereof to the OJC server host. In one exemplary embodiment, the structure of the said command 22 is as below:

| Structure | Example |
|---|---|
| CommandName | 22 (APP_REPLY_MACHINE_REACH_ACK) |
| HostPacketID | 101 |
| AppUsername | 85297911476 |

The aforementioned command 22 is transferred in JSON format as: {"CommandName":"22","HostPacketID":"101","AppUsername":"85297911476"}

Command 23:

APP_REPLY_MACHINE_REJECT (Indicates that the reply message has reached the OJC server host, but the reply message has been rejected (e.g. due to expiry of audience (i.e. communication relation)). In one exemplary embodiment, the structure of the said command 23 is as below:

| Structure | Example |
|---|---|
| CommandName | 23 (APP_REPLY_MACHINE_REJECT) |
| HostPacketID | 101 |
| AppPacketID | 7 |
| AppUsername | 85297911476 |
| AppMsgID | 500 |
| MsgRID | 40000 |
| MachineRejectTimestamp | 1376372288 |
| RejectErrorCode | 334 |

The aforementioned command 23 is transferred in JSON format as: {"CommandName":"23","HostPacketID":"101","AppPacketID":"7","AppUsername":"85297911476","AppMsgID":"500","MsgRID":"40000","MachineRejectTimestamp":"1376372288","RejectErrorCode":"334"}

Command 24:

APP_REPLY_MACHINE_REJECT_ACK (Indicates that the XMPP client App received the packet—"APP_REPLY_MACHINE_REJECT", and hence the XMPP client App return an acknowledgement thereof to the OJC server host). In one exemplary embodiment, the structure of the said command 24 is as below:

| Structure | Example |
| --- | --- |
| CommandName | 24 (APP_REPLY_MACHINE_REJECT_ACK) |
| HostPacketID | 101 |
| AppUsername | 85297911476 |

The aforementioned command 24 is transferred in JSON format as: {"CommandName":"24","HostPacketID":"101", "AppUsername":"85297911476"}

Command 25:

APP_REPLY_ADMIN_READ (Indicates that the reply message from the XMPP client App has been read by the machine, and hence the OJC server returns a read receipt of the same to the XMPP client App). In one exemplary embodiment, the structure of the said command 25 is as below:

| Structure | Example |
| --- | --- |
| CommandName | 25 (APP_REPLY_ADMIN_READ) |
| HostPacketID | 102 |
| AppUsername | 85297911476 |
| AppMsgID | 500 |
| MsgRID | 40000 |
| MachineReachTimestamp | 1376372288 |
| AdminReadTimestamp | 1376372290 |

The aforementioned command 25 is transferred in JSON format as: {"CommandName":"25","HostPacketID":"102", "AppUsername":"85297911476","AppMsgID":"500","MsgRID":"40000","MachineReachTimestamp": "1376372288","AdminReadTimes tamp":"1376372290"}

Command 26:

APP_REPLY_ADMIN_READ_ACK (Indicates that the XMPP client App has received the packet—"APP_REPLY_ADMIN_READ" and hence the XMPP client App returns an acknowledgement to the OJC server host). In one exemplary embodiment, the structure of the said command 26 is as below:

| Structure | Example |
| --- | --- |
| CommandName | 26 (APP_REPLY_ADMIN_READ_ACK) |
| HostPacketID | 102 |
| AppUsername | 85297911476 |

The aforementioned command 26 is transferred in JSON format as: {"CommandName":"26","HostPacketID":"102", "AppUsername":"85297911476"}

Figure 12:
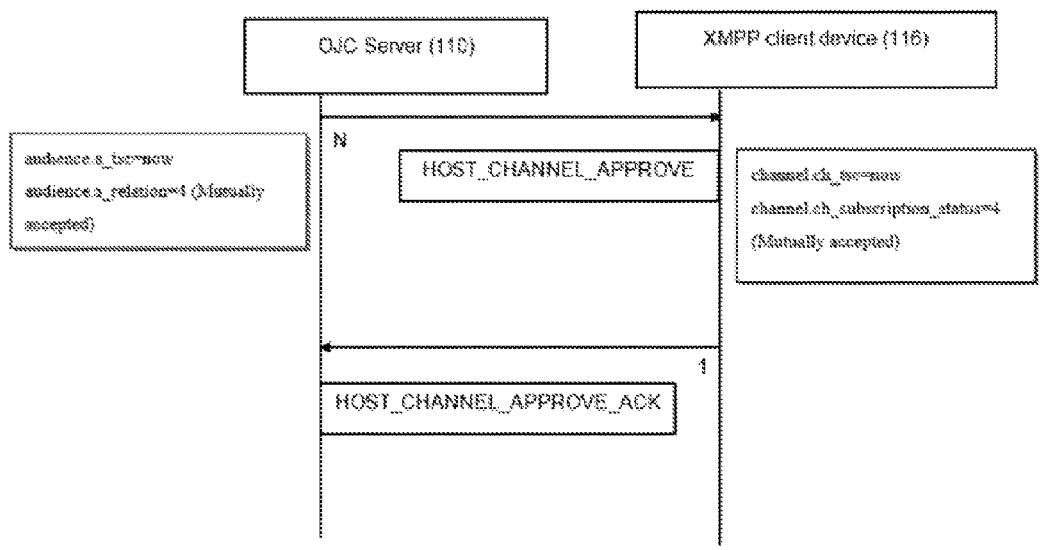

Now referring to FIG. 12 is a diagram illustrating exchange of a data packet between the XMPP client device 116 and the OJC server 110 pertaining to approval/rejection/blocking of a channel belonging to the web user, in accordance with an embodiment of the present disclosure. As shown, the channel approval/rejection/blocking is facilitated through various commands (exchanged as data packets) including HOST_CHANNEL_APPROVE OR HOST_CHANNEL_REJECT (not shown), HOST_CHANNEL_APPROVE_ACK OR HOST_ CHANNEL_REJECT_ACK (not shown), HOST_ CHANNEL_BLOCK (not shown) OR HOST_ CHANNEL_UNBLOCK (not shown), HOST_ CHANNEL_BLOCK_ACK (not shown) OR HOST_ CHANNEL_UNBLOCK_ACK (not shown), HOST_ CHANNEL_CHANGE_PROFILE (not shown) and HOST_ CHANNEL_CHANGE_PROFILE_ACK (not shown). The structure of each of the commands (and an example therefor) is described hereinafter in subsequent paragraphs:

Command 40:

HOST_CHANNEL_APPROVE (Indicates that the OJC server host has approved a channel subscription request from the XMPP client App). In one exemplary embodiment, the structure of the said command 40 is as below:

| Structure Name | Example |
| --- | --- |
| CommandName | 40 (HOST_CHANNEL_APPROVE) |
| HostPacketID | 110 |
| AppUsername | 85297911476 |
| ChannelID | 1 (Meteorsis) |

The aforementioned command 40 is transferred in JSON format as: {"CommandName":"40","HostPacketID":"110", "AppUsername":"85297911476","ChannelID":"1"}

Command 41:

HOST_CHANNEL_APPROVE_ACK (Indicates that the XMPP client App has received the packet—"HOST_CHANNEL_APPROVE" from the OJC server host and hence the XMPP client App returns an acknowledgement thereof to the OJC server host). In one exemplary embodiment, the structure of the said command 41 is as below:

| Structure | Example |
| --- | --- |
| CommandName | 41 (HOST_CHANNEL_APPROVE_ACK) |
| HostPacketID | 110 |
| AppUsername | 85297911476 |

The aforementioned command 41 is transferred in JSON format as: {"CommandName":"41","HostPacketID":"110", "AppUsername":"85297911476"}

Command 42:

HOST_ CHANNEL_REJECT (Indicates that the OJC server host has rejected a channel subscription request from the XMPP client App). In one exemplary embodiment, the structure of the said command 42 is as below:

| Structure Name | Example |
| --- | --- |
| CommandName | 42 (HOST_CHANNEL_REJECT) |
| HostPacketID | 111 |
| AppUsername | 85297911476 |
| ChannelID | 1 (Meteorsis) |

The aforementioned command 42 is transferred in JSON format as: {"CommandName":"42","HostPacketID":"111", "AppUsername":"85297911476","ChannelID":"1"}

Command 43:

HOST_ CHANNEL_REJECT_ACK (Indicates that the XMPP client App has received the packet—"HOST_ CHANNEL_REJECT" from the OJC server host and hence the XMPP client returns and acknowledgement to the OJC server host). In one exemplary embodiment, the structure of the said command 43 is as below:

| Structure | Example |
| --- | --- |
| CommandName | 43 (HOST_CHANNEL_REJECT_ACK) |
| HostPacketID | 111 |
| AppUsername | 85297911476 |

The aforementioned command 43 is transferred in JSON format as: {"CommandName":"43","HostPacketID":"111", "AppUsername":"85297911476"}

Command 44:

HOST_CHANNEL_BLOCK (Indicates that the OJC server host has blocked a current channel subscribed by the XMPP client App). In one exemplary embodiment, the structure of the said command 44 is as below:

| Structure Name | Example |
| --- | --- |
| CommandName | 44 (HOST_CHANNEL_BLOCK) |
| HostPacketID | 112 |
| AppUsername | 85297911476 |
| ChannelID | 1 (Meteorsis) |

The aforementioned command 44 is transferred in JSON format as: {"CommandName":"44","HostPacketID":"112", "AppUsername":"85297911476","ChannelID":"1"}

Command 45:

HOST_CHANNEL_BLOCK_ACK (Indicates that the XMPP client App has received a packet—"HOST_CHANNEL_BLOCK" from the OJC server host). In one exemplary embodiment, the structure of the said command 45 is as below:

| Structure | Example |
| --- | --- |
| CommandName | 45 (HOST_CHANNEL_BLOCK_ACK) |
| HostPacketID | 112 |
| AppUsername | 85297911476 |

The aforementioned command 45 is transferred in JSON format as: {"CommandName":"45","HostPacketID":"112", "AppUsername":"85297911476"}

Command 46:

HOST_CHANNEL_UNBLOCK (Indicates that the OJC server host has unblocked the current channel for the XMPP client App). In one exemplary embodiment, the structure of the said command 46 is as below:

| Structure Name | Example |
| --- | --- |
| CommandName | 46 (HOST_CHANNEL_UNBLOCK) |
| HostPacketID | 113 |
| AppUsername | 85297911476 |
| ChannelID | 1 (Meteorsis) |

The aforementioned command 46 is transferred in JSON format as: {"CommandName":"46","HostPacketID":"113", "AppUsername":"85297911476","ChannelID":"1"}

Command 47:

HOST_CHANNEL_UNBLOCK_ACK (Indicates that the XMPP client App has received a packet—"HOST_CHANNEL_UNBLOCK" from the OJC server, hence the XMPP client app returns an acknowledgement thereof to the OJC server host). In one exemplary embodiment, the structure of the said command 47 is as below:

| Structure | Example |
| --- | --- |
| CommandName | 47 (HOST_CHANNEL_UNBLOCK_ACK) |
| HostPacketID | 113 |
| AppUsername | 85297911476 |

The aforementioned command 47 is transferred in JSON format as: {"CommandName":"47","HostPacketID":"113", "AppUsername":"85297911476"}

Command 48:

HOST_CHANNEL_CHANGE_PROFILE (Indicates that the OJC server host has changed the details of the channel subscribed by the XMPP client App. In one example, the details of the channel may include logo, company name and description etc.). In one exemplary embodiment, the structure of the said command 48 is as below:

| Structure Name | Example |
| --- | --- |
| CommandName | 48 (HOST_CHANNEL_CHANGE_PROFILE) |
| HostPacketID | 114 |
| AppUsername | 85297911476 |
| ChannelID | 1 (Meteorsis) |
| ChannelName | Meteors Information Systems Limited |
| ChannelDescription | Provides SMS service |
| CompanyWebsite | http://www.meteorsis.com |
| LogoDownloadURL | meteorsis-logo-1391675464.jpg |

The aforementioned command 48 is transferred in JSON format as: {"CommandName":"48","HostPacketID":"114", "AppUsername":"85297911476","ChannelID":"1","ChannelName":"Meteors Information Systems Limited","ChannelDescription":"Provides SMS service", "CompanyWebsite":"http://www.meteorsis.com","LogoDownloadURL":"meteorsis-logo-1391675464.jpg"}

Command 49:

HOST_CHANNEL_CHANGE_PROFILE_ACK (Indicates that XMPP client App has received a packet—"HOST_CHANNEL_CHANGE_PROFILE" from the OJC server, hence the XMPP client app returns an acknowledgement thereof to the OJC server host.). In one exemplary embodiment, the structure of the said command 49 is as below:

| Structure | Example |
| --- | --- |
| CommandName | 49 (HOST_CHANNEL_CHANGE_PROFILE_ACK) |
| HostPacketID | 114 |
| AppUsername | 85297911476 |

The aforementioned command 49 is transferred in JSON format as: {"CommandName":"49","HostPacketID":"114", "AppUsername":"85297911476"}

Figure 13:
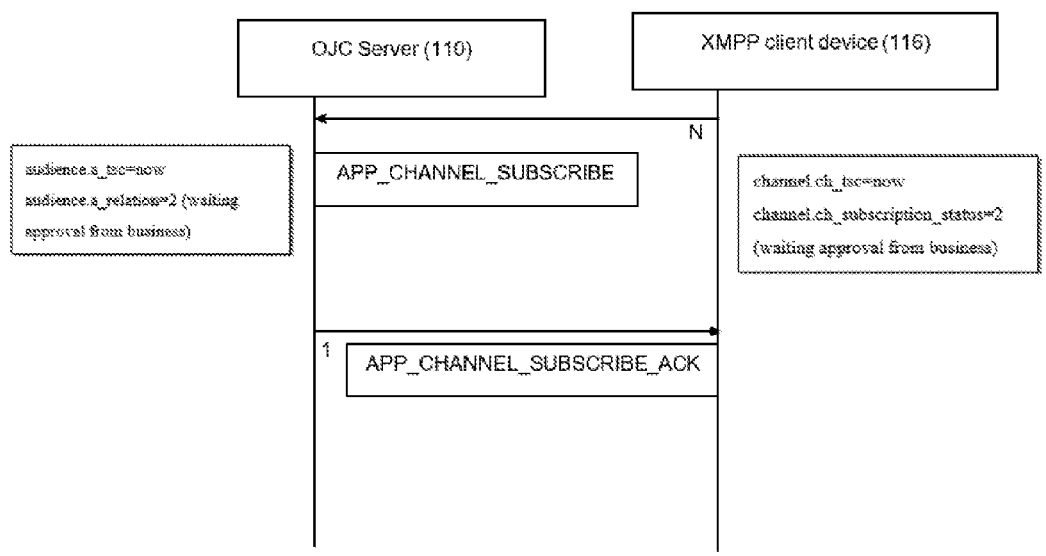

The aforementioned channel may be subscribed by the XMPP client App based upon a subscription request received from the XMPP client app to the OJC server host. FIG. 13 illustrates data packets namely, APP_CHANNEL_REQUEST_SUBSCRIBE and APP_CHANNEL_REQUEST_SUBSCRIBE_ACK exchanged between the XMPP client App and the OJC server host that facilitates the issuance of channel subscription request to the OJC server host by the XMPP client App. Based upon the receipt of the channel subscription request, the OJC server host may either approve/reject the channel by exchanging the data packets (shown in FIG. 12) as explained above.

Figure 14:
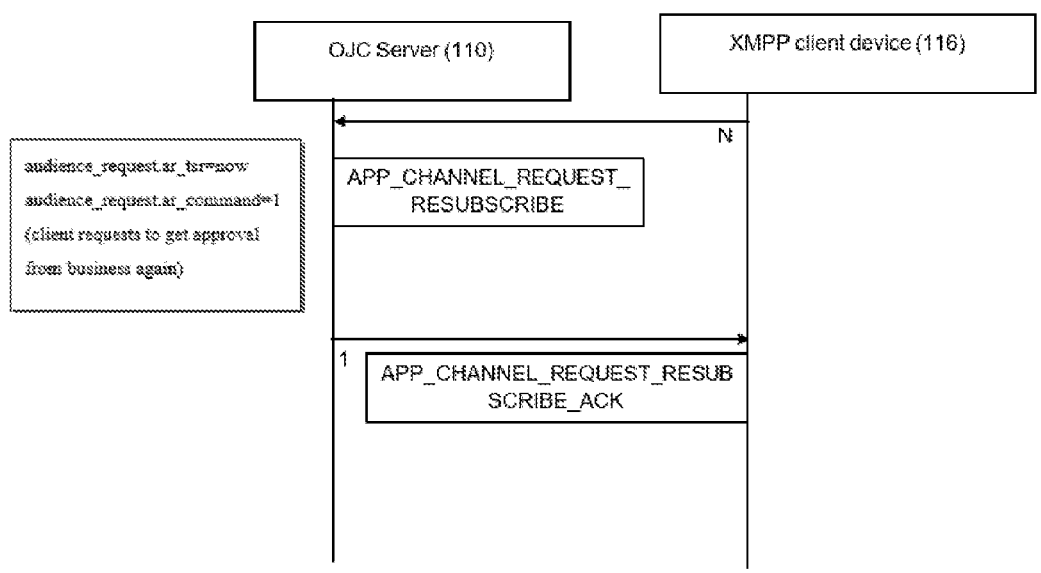

Now referring to FIG. 14 is a diagram illustrating exchange of a data packet between the XMPP client device 116 and the OJC server 110 to request for re-subscription of a channel belonging to the web user, in accordance with an embodiment of the present disclosure. As shown, the channel re-subscription request is facilitated through various commands (exchanged as data packets) including APP_CHANNEL_REQUEST_RESUBSCRIBE, APP_CHANNEL_REQUEST_RESUBSCRIBE_ACK, APP_CHANNEL_REQUEST_UNBLOCK (not shown) and APP_CHANNEL_REQUEST_UNBLOCK_ACK (not shown). The structure of each of the commands (and an example therefor) is described hereinafter in subsequent paragraphs:

Command 54:
APP_CHANNEL_REQUEST_RESUBSCRIBE (Indicates that XMPP client App has sent a request to re-subscribe a channel to the OJC server host). In one exemplary embodiment, the structure of the said command 54 is as below:

| Structure Name | Example |
| --- | --- |
| CommandName | 54 (APP_CHANNEL_REQUEST_RESUBSCRIBE) |
| AppPacketID | 83 |
| AppUsername | 85297911476 |
| ChannelID | 1 (Meteorsis) |

The aforementioned command 54 is transferred in JSON format as: {"CommandName":"54","AppPacketID":"83", "AppUsername":"85297911476","ChannelID":"1"}

Command 55:
APP_CHANNEL_REQUEST_RESUBSCRIBE_ACK (Indicates that the OJC server host has received a packet—"APP_CHANNEL_REQUEST_RESUBSCRIBE" from the XMPP client App and hence the OJC server host returns an acknowledgement thereof to the XMPP client App). In one exemplary embodiment, the structure of the said command 55 is as below:

| Structure | Example |
| --- | --- |
| CommandName | 55 (APP_CHANNEL_REQUEST_RESUBSCRIBE_ACK) |
| AppPacketID | 83 |
| AppUsername | 85297911476 |

The aforementioned command 55 is transferred in JSON format as: {"CommandName":"55","AppPacketID":"83", "AppUsername":"85297911476"}

Command 56:
APP_CHANNEL_REQUEST_UNBLOCK (Indicates that the XMPP client App has sent a request to the OJC server host to unblock a channel). In one exemplary embodiment, the structure of the said command 56 is as below:

| Structure Name | Example |
| --- | --- |
| CommandName | 56 (APP_CHANNEL_REQUEST_UNBLOCK) |
| AppPacketID | 84 |
| AppUsername | 85297911476 |
| ChannelID | 1 (Meteorsis) |

The aforementioned command 56 is transferred in JSON format as: {"CommandName":"56","AppPacketID":"84", "AppUsername":"85297911476","ChannelID":"1"}

Command 57:
APP_CHANNEL_REQUEST_UNBLOCK_ACK (Indicates that the OJC server host has received a packet—"APP_CHANNEL_REQUEST_UNBLOCK" from the XMPP client App and hence the OJC server host returns an acknowledgement thereof to the XMPP client App). In one exemplary embodiment, the structure of the said command 57 is as below:

| Structure | Example |
| --- | --- |
| CommandName | 57 (APP_CHANNEL_REQUEST_UNBLOCK_ACK) |
| AppPacketID | 84 |
| AppUsername | 85297911476 |

The aforementioned command 57 is transferred in JSON format as: {"CommandName":"57","AppPacketID":"84", "AppUsername":"85297911476"}

It is to be noted that flow of data packets shown in FIG. 10 to FIG. 14 is indicated as either 'N' or '1'. If the flow of a data packet is indicated as 'N', then the respective data packet is retried for transmission 'N' number of times by a sender (i.e. either the OJC server 110 or the XMPP client device 116) a receiver (i.e. either the OJC server 110 or the XMPP client device 116) until the said data packet receives its corresponding acknowledgement to cancel out. In one embodiment, 'N' may vary from 1-10. Alternatively, if the flow of the data packet is indicated as '1', then the data packet is sent only once without making further attempts of transmission. In this case, even if duplicate packets indicated as 'N' are received afterwards, a new packet (with different packet id) indicated as "1" is recorded as an acknowledgement.

Figure 15:
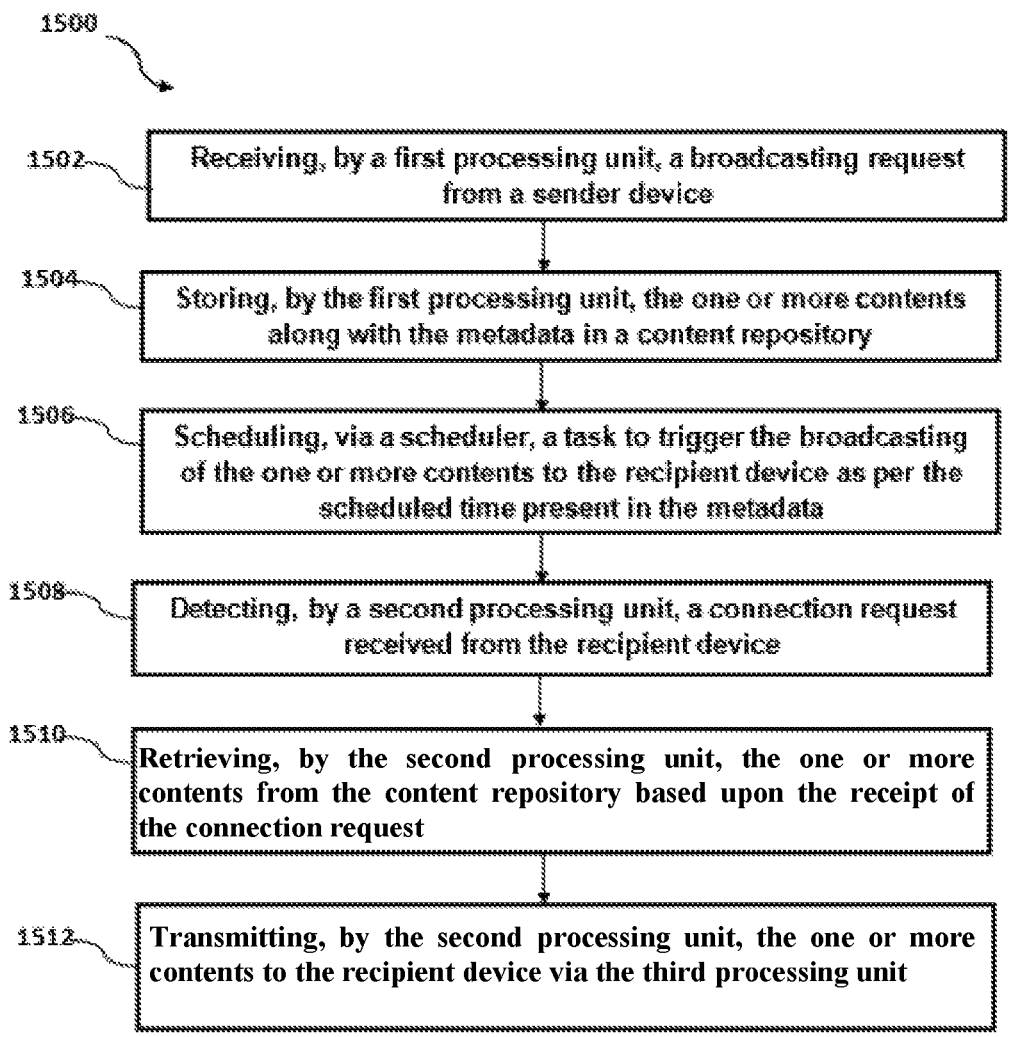
FIG. 15 illustrates a method 1500 for broadcasting of one or more contents to a recipient device, in accordance with an embodiment of the present subject matter.

Now, referring to FIG. 15, a method 1500 for broadcasting one or more contents to a recipient device is shown, in accordance with an embodiment of the present subject matter. The order in which the method 1500 is described is not intended to be construed as a limitation, and any number of the described method blocks can be combined in any order to implement the method 1500 or alternate methods. Furthermore, the method 1500 can be implemented in any suitable hardware, software, firmware, or combination thereof. However, for ease of explanation, in the embodiments described below, the method 1500 may be considered to be implemented in the above described system 100.

At block 1502, a broadcasting request is received by a first processing unit 106 from a sender device 102. In one implementation, the first processing unit 106 is a web server communicatively coupled to the sender device 102. The first processing unit 106 may receive the broadcasting request via a web browser 104 associated to the sender device. In an embodiment, the broadcasting request may comprise one or more contents to be broadcasted to the recipient device 116 along with the metadata associated to the one or more contents. The metadata may comprise at least an identity of the user (i.e. App user) of the recipient device 116 (i.e.

XMPP App) and a scheduled time for the broadcasting of the one or more contents to the recipient device 116.

At block 1504, the one or more contents along with the metadata may be stored in the content repository 108 coupled to the first processing unit 106. In one implementation, the one or more contents along with the metadata is stored in the content repository 108 by the first processing unit 106.

At block 1506, a task for triggering the broadcasting the one or more contents to the recipient device as per the scheduled time in the metadata may be scheduled via a task scheduling device 114.

At block 1508, a connection request received from the recipient device 116 may be detected by the second processing unit 110. In one embodiment, the second processing unit 110 is an OJC server. The OJC server further comprises a cluster of computing nodes. The connection request is received by the second processing unit 110 via the third processing unit 112 communicatively coupled with the recipient device 116. In one embodiment, the third processing unit 112 is an XMPP server and the recipient device 116 is an XMPP client device 116. The connection request indicates the recipient device's intention to receive the one or more contents.

At block 1510, the one or more contents may be retrieved from the content repository 108 by the second processing unit 110 based upon the receipt of the connection request. In one implementation, the one or more contents are retrieved by the second processing unit 110 via at least one computing node in the cluster of computing nodes (shown in FIG. 8).

At block 1512, the one or more contents retrieved are transmitted by the second processing unit 110 to the recipient device 116 via the third processing unit 112. In one implementation, the one or more contents are transmitted by the second processing unit 110 using the at least one computing node via the third processing unit 112. In an embodiment, the at least one computing node connects with the third processing unit 112 over a TCP session via a communication port in order to facilitate the transfer of the one or more contents to the recipient device 116.

Exemplary embodiments discussed above may provide certain advantages. Though not required to practice aspects of the disclosure, these advantages may include those provided by the following features.

Some embodiments of the present disclosure enable a system and method for instantaneous transfer of messages from a web-based application to multiple XMPP client devices via a single non-XMPP component (such as OJC server).

Some embodiments of the present disclosure enable a system and method for authenticating the XMPP App user with an XMPP server based upon a dynamic password generated in real time for the current login session initiated between the XMPP App user and the XMPP server.

Some embodiments of the present disclosure enable a system and method for broadcasting the contents/messages to the XMPP client devices through a cluster of external components/computing nodes using a load balancing algorithm.

Some embodiments of the present disclosure enable a system and method for achieving prompt visual response to the web user by rendering the delivery results to the web user based on a Full-Load-Paging algorithm Although implementations for methods and systems for broadcasting one or more contents to a recipient device have been described in language specific to structural features and/or methods, it is to be understood that the appended claims are not necessarily limited to the specific features or methods described. Rather, the specific features and methods are disclosed as examples of implementations for broadcasting one or more contents to a recipient device.

What is claimed is:

1. A method for broadcasting one or more contents to a recipient device, the method comprising:
receiving, by a first processing device, a broadcasting request from a sender device, wherein the broadcasting request comprises one or more contents along with metadata associated to the one or more contents, and wherein the one or more broadcasting contents are to be broadcasted to a recipient device;
storing, by the first processing device, the one or more contents along with the metadata in a content repository coupled to the first processing device;
detecting, by a second processing device coupled to the content repository, a connection request received from the recipient device, wherein the connection request is received by the second processing device via a third processing device communicatively coupled with the recipient device, and wherein the connection request is received to initiate broadcasting of the one or more contents to the recipient device;
wherein the second processing device, the third processing device and the recipient device is an OJC server, an XMPP server and XMPP client device respectively, wherein the OJC server further comprises a cluster of computing nodes;
wherein at least one computing node is configured to:
fetch the one or more contents from the content repository after the receipt of the connection request from the XMPP client device via the XMPP server and transfer the one or more contents to the XMPP client device via the XMPP server;
wherein the XMPP server authenticates the XMPP client device based upon a dynamic password generated in a real time for a current login session initiated between the XMPP server and the XMPP client device;
transmitting, by the second processing device, the one or more contents to the recipient device via the third processing device.

2. The method of claim 1, wherein the first processing device is a web server, and wherein the broadcasting request is received by the web server from the sender device via a web browser associated to the sender device.

3. The method of claim 1, wherein the one or more contents comprises at least one of a text message, an audio message, a video message, a multimedia message, an image and a combination thereof.

4. The method of claim 1, wherein the metadata comprises at least an identity of a user of the recipient device and a scheduled time for the broadcasting of the one or more contents to the recipient device.

5. The method of claim 4 further comprising scheduling, via a task scheduling device coupled to the web server, a task to trigger the broadcasting of the one or more contents to the recipient device as per the scheduled time present in the metadata.

6. The method of claim 5 further comprising notifying, via the task scheduling device, the recipient device to trigger the connection request for the receipt of the one or more contents based upon the scheduled time.

7. The method of claim 1, wherein the XMPP client device is configured to transmit the connection request via the XMPP server after the authentication of the XMPP client device by the XMPP server.

8. The method of claim 1, wherein the dynamic password is generated based upon at least one of a recipient identifier, a content identifier associated to a last content retrieved by the recipient device, a timestamp corresponding to last login session between the XMPP server and the XMPP client device and a combination thereof.

9. The method of claim 1, wherein the at least one computing node connects with the XMPP server over a TCP session via a communication port for the transfer of the one or more contents, and wherein the connection is established based upon receiving, by the XMPP server, a stream from the at least one computing node;
transmitting, by the XMPP server, a stream header to the at least one computing node, wherein the stream header comprises at least a stream identifier associated with the said stream;
receiving, by the XMPP server, a handshake signal from the at least one computing node, wherein the handshake signal comprises at least the stream identifier concatenated with a pre-shared secret key; and
transmitting, by the XMPP server, an acknowledgement signal, in response to the handshake signal, to the at least one computing node, wherein the acknowledgement signal indicates successful connection being established between the XMPP server and the at least one computing node.

10. The method of claim 9, wherein the at least one computing node is further configured to receive, from the XMPP server, at least one of a response content corresponding to the one or more contents and a confirmation message indicative of the one or more contents being accessed by the recipient device.

11. The method of claim 10, wherein the at least one computing node is further configured to update the content repository regarding the receipt of the response content, corresponding to the one or more contents, or the one or more contents being accessed by the recipient device or a combination thereof.

12. A system for broadcasting one or more contents to a recipient device, the system comprising:
a first processing device communicatively coupled to a sender device, wherein the first processing device is configured to:
receive a broadcasting request from the sender device, wherein the broadcasting request comprises one or more contents along with metadata associated to the one or more contents, and wherein the one or more contents are to be broadcasted to a recipient device, and store the one or more contents along with the metadata in a content repository coupled to the first processing device; and
a second processing device communicatively coupled with the recipient device via a third processing device, wherein the second processing device is configured to detect a connection request received from the recipient device,
wherein the connection request is received via the third processing device, and wherein the connection request is received to initiate broadcasting of the one or more contents to the recipient device,
wherein the second processing device, the third processing device and the recipient device is an OJC server, an XMPP server and XMPP client device respectively, wherein the OJC server further comprises a cluster of computing nodes,
wherein the at least one computing node connects with the XMPP server over a TCP session via a communication port for the transfer of the one or more contents, and wherein the connection is established based upon receiving, by the XMPP server, a stream from the at least one computing node,
transmitting, by the XMPP server, a stream header to the at least one computing node, wherein the stream header comprises at least a stream identifier associated with the said stream,
receiving, by the XMPP server, a handshake signal from the at least one computing node, wherein the handshake signal comprises at least the stream identifier concatenated with a pre-shared secret key, and
transmitting, by the XMPP server, an acknowledgement signal, in response to the handshake signal, to the at least one computing node, wherein the acknowledgement signal indicates successful connection being established between the XMPP server and the at least one computing node, and
transmit the one or more contents to the recipient device via the third processing device.

13. The system of claim 12, wherein the first processing device is a web server, and wherein the broadcasting request is received by the web server from the sender device via a web browser associated to the sender device.

14. The system of claim 13 further comprising a task scheduling device, coupled to the web server, configured to schedule a task to trigger the broadcasting of the one or more contents to the recipient device as per the scheduled time present in the metadata, and wherein the task scheduling device notifies the recipient device to trigger the connection request for the receipt of the one or more contents based upon expiry of the scheduled time.

15. The system of claim 12, wherein the at least one computing node is further configured to receive, from the XMPP server, at least one of a response content corresponding to the one or more contents and a confirmation message indicative of the one or more contents being accessed by the recipient device.

16. The system of claim 15, wherein the at least one computing node is further configured to update the content repository regarding the receipt of the response content, corresponding to the one or more contents, or the one or more contents being accessed by the recipient device or combination thereof.

* * * * *